United States Patent
Hatasaki et al.

(10) Patent No.: US 9,122,530 B2
(45) Date of Patent: Sep. 1, 2015

(54) MANAGEMENT APPARATUS AND MANAGEMENT METHOD

(75) Inventors: Keisuke Hatasaki, Kawasaki (JP);
Yoshifumi Takamoto, Kokubunji (JP);
Takashi Tameshige, Tokyo (JP)

(73) Assignee: HITACHI, LTD., Tokyo (JP)

( * ) Notice: Subject to any disclaimer, the term of this patent is extended or adjusted under 35 U.S.C. 154(b) by 685 days.

(21) Appl. No.: 12/709,272

(22) Filed: Feb. 19, 2010

(65) Prior Publication Data

US 2011/0010634 A1   Jan. 13, 2011

(30) Foreign Application Priority Data

Jul. 9, 2009   (JP) .................. 2009-162410

(51) Int. Cl.
G06F 3/00   (2006.01)
G06F 9/50   (2006.01)

(52) U.S. Cl.
CPC ........ G06F 9/5011 (2013.01); *G06F 2209/501* (2013.01)

(58) Field of Classification Search
CPC ........................................................ G06F 3/00
USPC ............ 715/739; 709/218, 226; 718/100, 104
See application file for complete search history.

(56) References Cited

U.S. PATENT DOCUMENTS

| | | | | |
|---|---|---|---|---|
| 4,890,227 A | * | 12/1989 | Watanabe et al. ............... | 706/14 |
| 5,794,224 A | * | 8/1998 | Yufik .............................. | 706/14 |
| 6,192,480 B1 | * | 2/2001 | Barrus ........................... | 713/320 |
| 6,587,938 B1 | * | 7/2003 | Eilert et al. .................... | 712/29 |
| 7,107,274 B2 | * | 9/2006 | Sekiguchi et al. ............. | 707/781 |
| 7,171,548 B2 | * | 1/2007 | Smith et al. .................... | 713/1 |

(Continued)

FOREIGN PATENT DOCUMENTS

| | | |
|---|---|---|
| JP | 2006-030691 A | 2/2006 |
| JP | 2006-309691 A | 11/2006 |

(Continued)

OTHER PUBLICATIONS

Japanese Office Action dated Jun. 4, 2013 (Application No. 2009-162410).

*Primary Examiner* — Amy Ng
(74) *Attorney, Agent, or Firm* — Kilpatrick Townsend & Stockton LLP

(57) ABSTRACT

A highly reliable management apparatus and management method capable of allocating a resource that satisfies a user's request is suggested.
A management apparatus and management method for managing a plurality of computer resources and allocating a requested computer resource to a user in response to a resource request for allocation of the computer resource, wherein the resource request contains a performance requirement and function requirement for the computer resource for which allocation is requested; performance information about performance of each computer resource and function information about a function of each computer resource are obtained; the plurality of computer resources are searched for candidates for the computer resource to be allocated to the user, based on the obtained performance information and function information about each computer resource and the performance requirement and function requirement requested in the resource request; the computer resource to be allocated to the user is decided from among the candidates detected by the search; and the decided computer resource is allocated to the user.

12 Claims, 27 Drawing Sheets

(56) References Cited

U.S. PATENT DOCUMENTS

| | | | |
|---|---|---|---|
| 7,463,648 B1* | 12/2008 | Eppstein et al. | 370/468 |
| 7,539,994 B2* | 5/2009 | McAlinden et al. | 718/104 |
| 7,581,008 B2* | 8/2009 | Zhang et al. | 709/226 |
| 7,660,872 B2* | 2/2010 | Delia et al. | 709/217 |
| 8,019,870 B1* | 9/2011 | Eppstein et al. | 709/226 |
| 8,312,463 B2* | 11/2012 | Smith et al. | 718/104 |
| 2002/0087611 A1* | 7/2002 | Tanaka et al. | 709/1 |
| 2003/0097393 A1* | 5/2003 | Kawamoto et al. | 709/1 |
| 2003/0217088 A1* | 11/2003 | Takamoto | 709/1 |
| 2004/0153867 A1* | 8/2004 | McAlinden et al. | 714/47 |
| 2004/0162901 A1* | 8/2004 | Mangipudi et al. | 709/225 |
| 2005/0091221 A1* | 4/2005 | Harris et al. | 707/10 |
| 2005/0102398 A1* | 5/2005 | Zhang et al. | 709/225 |
| 2006/0195578 A1* | 8/2006 | Ishida et al. | 709/226 |
| 2006/0218243 A1 | 9/2006 | Kudo et al. | |
| 2007/0098014 A1 | 5/2007 | Pomaranski et al. | |
| 2007/0233838 A1* | 10/2007 | Takamoto et al. | 709/223 |
| 2008/0155100 A1* | 6/2008 | Ahmed et al. | 709/226 |
| 2009/0103488 A1* | 4/2009 | Zhu et al. | 370/330 |
| 2009/0172168 A1 | 7/2009 | Sonoda et al. | |
| 2010/0088607 A1* | 4/2010 | Dumpeti et al. | 715/739 |
| 2011/0010634 A1* | 1/2011 | Hatasaki et al. | 715/739 |
| 2011/0219110 A1* | 9/2011 | Pfeffer et al. | 709/224 |
| 2011/0225501 A1* | 9/2011 | Uchida et al. | 715/739 |

FOREIGN PATENT DOCUMENTS

| | | |
|---|---|---|
| JP | 2007-94834 A | 4/2007 |
| JP | 2007-128511 A | 5/2007 |
| WO | 2008/041302 A1 | 4/2008 |

* cited by examiner

FIG.3

| FUNCTION | MAIN RESOURCE SHARING | CONFIGURATION CONDITIONS {41C} | | |
|---|---|---|---|---|
| | | TYPE | REQUIRED QUANTITY | SHARING |
| COLD STANDBY | IMPOSSIBLE | SERVER | +1 | POSSIBLE |
| | | CONTROL PROGRAM | 1 | IMPOSSIBLE |
| NETWORK REDUNDANCY | IMPOSSIBLE | NIC | −1 | IMPOSSIBLE |
| | | REDUNDANCY DRIVER | 1 | IMPOSSIBLE |
| SERVER VIRTUALIZATION 1 | POSSIBLE | CPU | −0.5GB | POSSIBLE |
| | | MEMORY | −512MB | |
| | | NIC | −1 | |
| | | STORAGE | −20GB | |
| | | HYPERVISOR | 1 | |
| HOT STANDBY | IMPOSSIBLE | SERVER | +1 | IMPOSSIBLE |
| | | NIC | −1 | |
| | | CLUSTER PROGRAM | 1 | IMPOSSIBLE |
| VIRTUALIZATION HA | IMPOSSIBLE | SERVER | +1 | POSSIBLE |
| | | NIC | −1 | |
| DYNAMIC RELOCATION | IMPOSSIBLE | SERVER | +1 | POSSIBLE |
| | | NIC | −1 | |
| SOFTWARE FAILURE AUTOMATIC REBOOT | IMPOSSIBLE | MONITORING PROGRAM | 1 | IMPOSSIBLE |
| POWER REDUNDANCY | IMPOSSIBLE | POWER SOURCE | 0 | − |
| UNINTERRUPTIBLE POWER SUPPLY | IMPOSSIBLE | UPS | 0 | − |
| MANAGEMENT APPARATUS REDUNDANCY | IMPOSSIBLE | MANAGEMENT APPARATUS | 0 | − |
| DISASTER RECOVERY (DR) | IMPOSSIBLE | SERVER | +1 | IMPOSSIBLE |
| | | EXTERNAL STORAGE | 0 | − |
| VIRTUALIZATION DR | IMPOSSIBLE | SERVER | +1 | POSSIBLE |
| EARTHQUAKE PROOF | IMPOSSIBLE | EARTHQUAKE-PROOF FACILITY | 0 | − |
| ⋮ | ⋮ | ⋮ | ⋮ | ⋮ |
| 41A | 41B | 41D | 41E | 41F |

| RESOURCE IDENTIFIER | PERFORMANCE | FUNCTION | PHYSICAL CONDITION | COST |
|---|---|---|---|---|
| SERVER 1 | CPU: 3.0 GHZ X 2; MEMORY: 4 GB<br>NIC x4, HBA x 4 | COLD STANDBY | SITE 1 | $0.4K /MONTH |
| SERVER 2 | CPU: 3.0 GHZ X 2; MEMORY: 4 GB<br>NIC x4, HBA x 4 | COLD STANDBY<br>NETWORK REDUNDANCY | SITE 1 | $0.5K /MONTH |
| SERVER 3 | CPU: 3.0 GHZ X 2; MEMORY: 4 GB<br>NIC x4, HBA x 4 | COLD STANDBY | SITE 1 | $0.5K /MONTH |
| SERVER 4 | CPU: 3.0 GHZ X 2; MEMORY: 4 GB<br>NIC x2, HBA x 2<br>DAS:80GB x 2 | NETWORK REDUNDANCY<br>HA | SITE 1 | $0.3K /MONTH |
| SERVER 5 | CPU: 3.0 GHZ X 2; MEMORY: 4 GB<br>NIC x4, HBA x 2<br>DAS:80GB x 2 | NETWORK REDUNDANCY<br>UNINTERRUPTIBLE POWER SUPPLY<br>HA | SITE 1 | $1.2K /MONTH |
| SERVER 6 | CPU: 3.0 GHZ X 4; MEMORY: 16GB<br>NIC x4, HBA x 2<br>DAS:80GB x 2 | VIRTUAL SERVER 1<br>VIRTUALIZATION HA<br>VIRTUALIZATION DR | SITE 2 | $1.0K /MONTH |
| SERVER7 | CPU: 3.0 GHZ X 8; MEMORY: 32GB<br>NIC x4, HBA x 2<br>DAS:160GB x 2 | VIRTUAL SERVER 2<br>VIRTUALIZATION HA<br>VIRTUALIZATION DR | SITE 2 | $1.0K /MONTH |
| SERVER8 | CPU: 3.0 GHZ X 4; MEMORY: 16GB<br>NIC x4, HBA x 2<br>DAS:120GB x 2 | VIRTUAL SERVER<br>VIRTUALIZATION DR<br>DYNAMIC RELOCATION | SITE 1 | $0.9K /MONTH |
| SERVER9 | CPU: 3.0 GHZ X 2; MEMORY: 4 GB<br>NIC x2, HBA x 2<br>DAS:80GB x 2 | NETWORK REDUNDANCY<br>HA | SITE 1 | $1.2K /MONTH |
| ⋮ | ⋮ | ⋮ | ⋮ | ⋮ |
| 42A | 42B | 42C | 42D | 42E |

| RESOURCE CONFIGU-RATION IDENTIFIER | MAIN RESOURCE | PERFORMANCE | CONFIGURED FUNCTION | CONFIGURATION CONDITION RESOURCES | CONFIGURATION CONDITION SHARING STATUS |
|---|---|---|---|---|---|
| CONFIGU-RATION 1 | SERVER 1 | CPU:3.0GHz x 2<br>MEMORY:4GB<br>NIC x4, HBA x 4 | COLD STANDBY | + SERVER 3 | SHARED (CONFIGURATION 2) |
| CONFIGU-RATION 2 | SERVER 2 | CPU:3.0GHz x 2<br>MEMORY:4GB<br>NIC x4, HBA x 4 | COLD STANDBY | + SERVER 3 | SHARED (CONFIGURATION 1) |
| CONFIGU-RATION 3 | SERVER 5 | CPU:3.0GHz x 2<br>MEMORY:4GB<br>NIC x4, HBA x 2<br>DAS:80GB x 2 | NETWORK REDUNDANCY | —NIC1 | |
| | | | | —NIC2 | |
| | | | UNINTERRUP-TIBLE POWER SUPPLY | | |
| CONFIGU-RATION 4 | SERVER 8 | CPU:1.0GHz x 1<br>MEMORY:1GB<br>NIC x1<br>DAS:20G | VIRTUAL SERVER 1 | —CPU 0.5GHz | SHARED (CONFIGURATION 5) |
| | | | | —MEM 512MB | SHARED (CONFIGURATION 5) |
| | | | | —NIC1 | SHARED(CONFI-GURATION 5) |
| | | | | —DAS 20GB | SHARED(CONFI-GURATION 5) |
| CONFIGU-RATION 5 | SERVER 8 | CPU:1.0GHz x 2<br>NIC x2<br>DAS:40G | VIRTUAL SERVER 2 | —CPU 0.5GHz | SHARED (CONFIGURATION 4) |
| | | | | —MEM 512MB | SHARED (CONFIGURATION 4) |
| | | | | —NIC1 | SHARED(CONFI-GURATION 4) |
| | | | | —DAS 20GB | SHARED(CONFI-GURATION 4) |
| ⋮ | ⋮ | ⋮ | ⋮ | ⋮ | ⋮ |
| 43A | 43B | 43C | 43D | 43E | 43F |

*FIG.6*

| REQUEST IDENTIFIER | PERFORMANCE REQUIREMENTS | FUNCTION REQUIREMENTS | RESOURCE-ALLOCATED USER | MAIN RESOURCE SHARING | FUNCTION CONFIGURATION RESOURCE SHARING | RESOURCE CONFIGURATION ALLOCATED TO USER |
|---|---|---|---|---|---|---|
| REQUEST 1 | CPU: 3.0GHz x 2<br>MEMORY: 4GB<br>NIC x2, HBA x 2 | COLD STANDBY | USER 1 | NOT PERMITTED | PERMITTED | CONFIGURATION 1 |
| REQUEST 2 | CPU: 3.0GHz x 1<br>MEMORY: 1GB<br>NIC x2,<br>DAS: 80G x 2 | NETWORK REDUNDANCY | USER 2 | NOT PERMITTED | NOT PERMITTED | CONFIGURATION 3 |
| REQUEST 3 | CPU: 1.0GHz x 1<br>MEMORY: 2GB<br>NIC x1<br>DAS: 20G | VIRTUAL SERVER | USER 3 | PERMITTED | PERMITTED | CONFIGURATION 4 |
| REQUEST 4 | CPU: 1.0GHz x 1<br>MEMORY: 2GB<br>NIC x1<br>DAS: 20G | VIRTUAL SERVER<br>VIRTUALIZA-TION HA | USER 4 | PERMITTED | PERMITTED | UNALLOCATED |
| ⋮ | ⋮ | ⋮ | ⋮ | ⋮ | ⋮ | ⋮ |
| 44A | 44B | 44C | 44D | 44E | 44F | 44G |

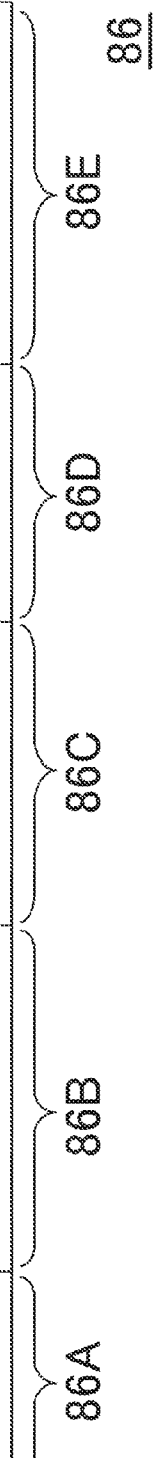

| IMPORTANCE LEVEL | FUNCTION REQUIREMENTS | MAIN RESOURCE SHARING | FUNCTION CONFIGURATION RESOURCE SHARING | THEORETICAL VALUE |
|---|---|---|---|---|
| 1 | NONE | PERMITTED | PERMITTED | AVAILABILITY:99% |
| 2 | NETWORK REDUNDANCY | PERMITTED | PERMITTED | AVAILABILITY:99.2% |
| 3 | NETWORK REDUNDANCY COLD STANDBY | PERMITTED | PERMITTED | AVAILABILITY:99.9% |
| 4 | NETWORK REDUNDANCY HA | NOT PERMITTED | PERMITTED | AVAILABILITY:99.99% |
| 5 | NETWORK REDUNDANCY COLD STANDBY HA | NOT PERMITTED | NOT PERMITTED | AVAILABILITY:99.999% |
| 86A | 86B | 86C | 86D | 86E |

| NUMBER | CONFIGURATION FUNCTION | OPERATION RESULTS | CONFIGURATION IDENTIFIER |
|---|---|---|---|
| 1 | COLD STANDBY | AVAILABILITY: 99.9% | CONFIGURATION 1 |
| 2 | COLD STANDBY | AVAILABILITY: 99.8% | CONFIGURATION 2 |
| 3 | NETWORK REDUNDANCY UNINTERRUPTIBLE POWER SUPPLY | AVAILABILITY: 99.3% | CONFIGURATION 3 |
| 4 | VIRTUAL SERVER | AVAILABILITY: 99% | CONFIGURATION 4 |
| 5 | VIRTUAL SERVER | AVAILABILITY: 98.9% | CONFIGURATION 5 |
| 6 | VIRTUAL SERVER VIRTUALIZATION HA | AVAILABILITY: 99.66% | NO CONFIGURATION |
| 7 | COLD STANDBY NETWORK REDUNDANCY | AVAILABILITY: 99.92% | NO CONFIGURATION |
| ... | ... | ... | ... |
| 107A | 107B | 107C | 107D |

107

MANAGEMENT APPARATUS AND MANAGEMENT METHOD

CROSS-REFERENCES TO RELATED APPLICATIONS

This application relates to and claims priority from Japanese Patent Application No. 2009-162410, filed on Jul. 9, 2009, the entire disclosure of which is incorporated herein by reference.

BACKGROUND

1. Field of the Invention

The present invention relates to a management apparatus and a management method and is suited for use in a management server for managing resources in, for example, a computer system.

2. Description of Related Art

One of conventional ways of operating a computer system is to manage computer resources such as servers and storage units (hereinafter simply referred to as the "resource(s)") as a pool, use a desired resource from among the resources belonging to the pool whenever necessary, and then return the resource to the pool when it is no longer needed.

In the above-described operation, a user reports requirements for the performance of resources such as the operating frequency of a CPU (Central Processing Unit), the capacity of memory installed, and the storage capacity (hereinafter referred to as the "performance requirements") to an administrator of the resources (hereinafter referred to as the "resource administrator").

The resource administrator who has received the above report selects a resource that satisfies the performance requirements, from the pool and allocates that resource to the user. As a result, the user uses the resource allocated by the resource administrator.

Incidentally, Japanese Patent Laid-Open (Kokai) Application Publication No. 2006-309691 discloses, regarding a system for pooling computers, to which no business application is allocated, and adding a pooled computer to a business application with insufficient resources, a technique of managing a specification of each computer, managing, for each business application, the relationship between the specification of the relevant computer and the number of processed requests when the relevant business application is operated using the above specification, and deciding a computer to be added to the business application with insufficient resources based on the above-mentioned information.

In normal computer systems, the quality of pooled resources (for example, functions installed in the resources) is often inhomogeneous. If a resource to be allocated to a user is decided based on the performance requirements (such as specifications) provided by the user as in the conventional art in the above-described circumstances, the resource that satisfies the user's intended purpose of use may sometimes not be provided.

Specifically speaking, a possible situation that may take place is that although the user intends to operate an important application, if the resource allocated by the resource administrator does not have an availability enhancing function, processing executed by the important application cannot be continued, for example, when a resource failure occurs.

The same thing can be said about the technique disclosed in Japanese Patent Laid-Open (Kokai) Publication No 2006-309691.

SUMMARY

The present invention was devised in consideration of the circumstances described above, and it is an object of the invention to suggest a highly-reliable management apparatus and management method capable of allocating resources that satisfy a user's request in a computer system where pooled resources are not homogeneous.

In order to solve the above-described problems, a management apparatus for managing a plurality of computer resources and allocating a requested computer resource to a user in response to a resource request for allocation of the computer resource is provided according to an aspect of the present invention, wherein the resource request contains a performance requirement and function requirement for the computer resource for which allocation is requested; and wherein the management apparatus includes: a configuration acquisition unit for obtaining performance information about each computer resource and function information about a function of each computer resource; a search unit for searching the plurality of computer resources for candidates for the computer resource to be allocated to the user, based on the obtained performance information and function information about each computer resource and the performance requirement and function requirement requested in the resource request and deciding the computer resource to be allocated to the user from among the candidates detected by the search; and an allocation unit for allocating the computer resource decided by the search unit to the user.

A management method for managing a plurality of computer resources and allocating a requested computer resource to a user in response to a resource request for allocation of the computer resource is also provided according to another aspect of the invention, wherein the resource request contains a performance requirement and function requirement for the computer resource for which allocation is requested; and wherein the management method includes: a first step of obtaining performance information about each computer resource and function information about a function of each computer resource; a second step of searching the plurality of computer resources for candidates for the computer resource to be allocated to the user, based on the obtained performance information and function information about each computer resource and the performance requirement and function requirement requested in the resource request and deciding the computer resource to be allocated to the user from among the candidates detected by the search; and a third step of allocating the decided computer resource to the user.

Resources that satisfy the user's request in terms of both performance and functions can be allocated according to the present invention. Therefore, even if the pooled resources are not homogeneous, it is possible to realize a highly reliable management apparatus and management method capable of allocating the resource that satisfies the user's request.

BRIEF DESCRIPTION OF THE DRAWINGS

FIG. 3 is a chart showing the configuration of a function table;

FIG. 4 is a chart showing the configuration of a resource table;

FIG. 5 is a chart showing the configuration of a configuration table;

FIG. 6 is a chart showing the configuration of a request table;

FIG. 20 is a chart showing the configuration of a correspondence table;

FIG. 23 is a chart showing the configuration of an operation result table;

DETAILED DESCRIPTION OF PREFERRED EMBODIMENTS

Embodiments of the present invention will be explained below with reference to the attached drawings.

(1) First Embodiment

(1-1) Configuration of Computer System According to This Embodiment

Figure 1:
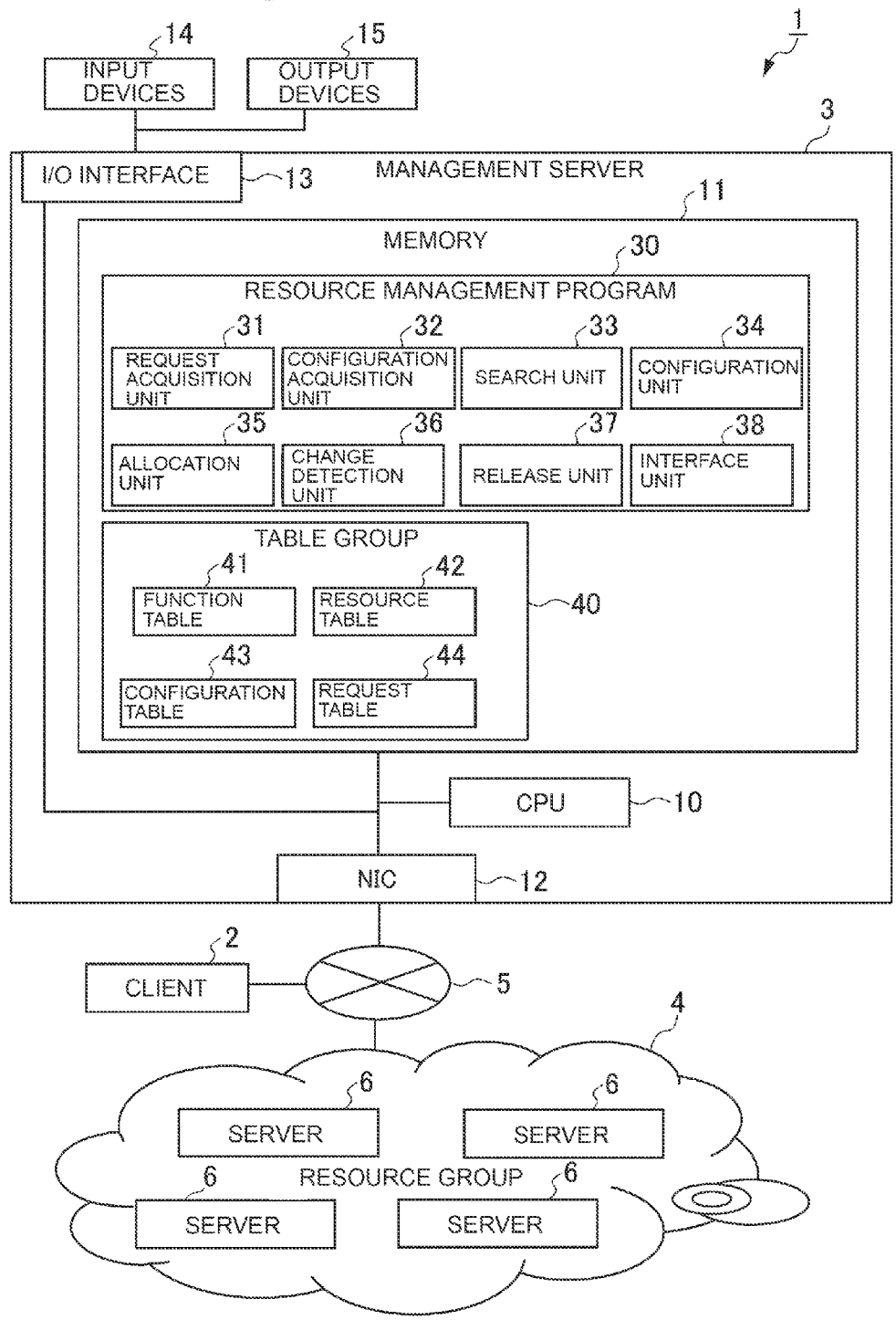
FIG. 1 is a block diagram showing the outline configuration of a computer system according to the first embodiment.

Referring to FIG. 1, reference numeral "1" represents a computer system as a whole according to this embodiment. This computer system 1 is constituted from a plurality of clients 2, a management server 3, and a resource group 4. These clients 2, the management server 3, and the resource group 4 are connected via a network 5.

The client 2 is a computer device used by a user and is composed of, for example, a personal computer, a workstation, or a mainframe. The client 2 executes various processing, using resources 6 in the resource group 4 managed by the management server 3.

The management server 3 has a function that manages each of the resources 6 constituting the resource group 4 and allocates the resource 6 that satisfies a resource request from the client 2, to the client 2 in response to the resource request from the client 2. The management server 3 is composed of, for example, a personal computer, a workstation, or a mainframe and includes a CPU 10, a memory 11, an NIC (Network Interface Card) 12, an I/O interface 13, input devices 14, and output devices 15.

The CPU 10 is a processor that controls the operation of the entire management server 3. This CPU 10 executes various control processing as the management server 3 as a whole by executing various programs stored in the memory 11. The memory 11 is used to retain various programs and control information and is also used as a work memory for the CPU 10.

The NIC 12 is a network interface for connecting the management server 3 to the network 5. The I/O interface 13 is an interface for connecting the input devices 14 and the output devices 15 to the management server 3 and is composed of, for example, a USB (Universal Serial Bus).

The input devices 14 are constituted from, for example, a keyboard, a mouse, and a microphone and are used when the resource administrator enters various operation inputs to the management server 3. The output devices 15 are constituted from, for example, a monitor display and a speaker and present information such as images and sounds to the resource administrator.

Figure 2:
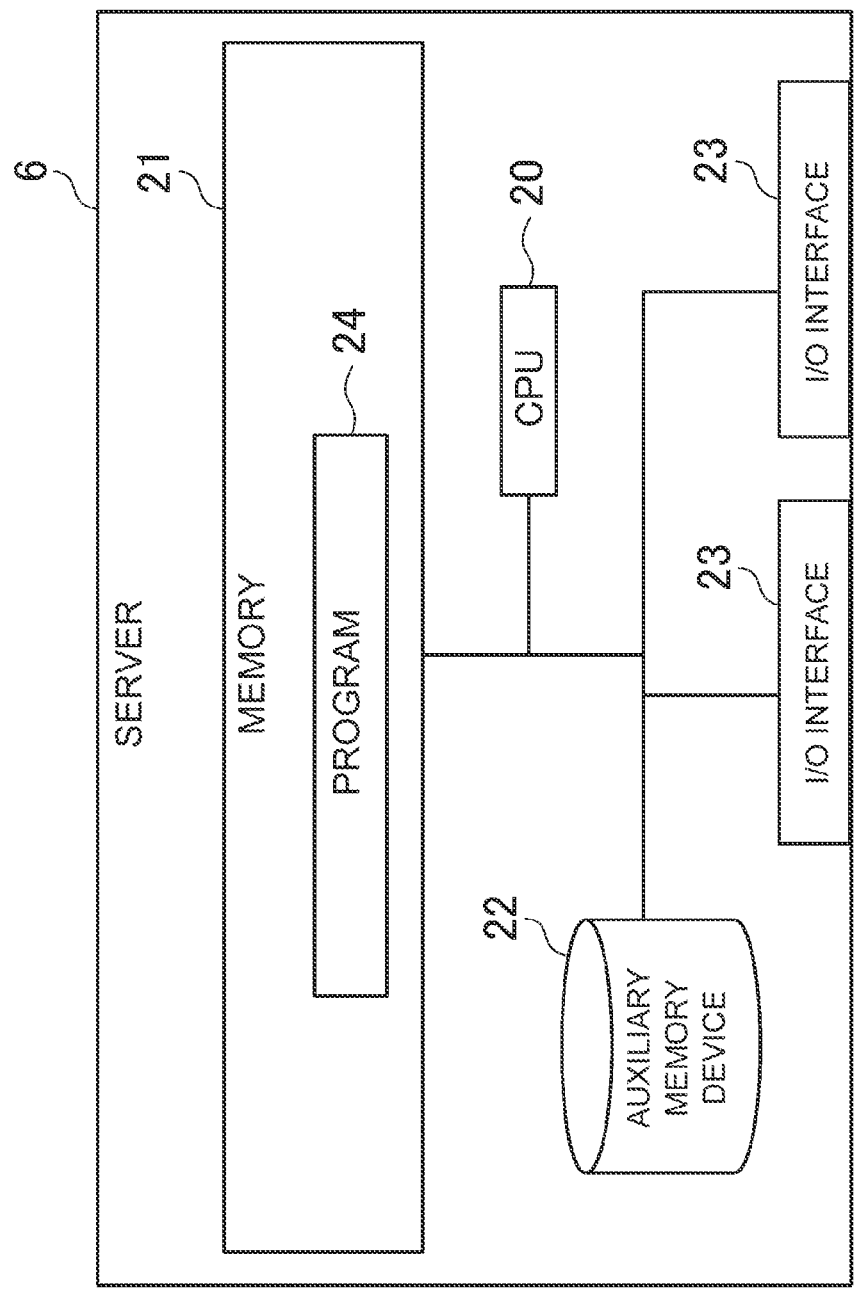
FIG. 2 is a block diagram showing the configuration of a server.

The resource group 4 is composed of a plurality of computer resources such as the servers 6 as well as I/O (Input/Output) interfaces, storage apparatuses, and networks (not shown). Each server 6 includes a CPU 20, a memory 21, an auxiliary memory device 22 such as hard disks or flash memories, and one or more I/O interfaces 23 as shown in FIG. 2. However, the auxiliary memory device 22 is not indispensable. The I/O interface 23 is composed of, for example, an NIC or an HBA (Host Bus Adaptor). The CPU 20 executes necessary control processing according to a program 24 stored in the memory 21.

(1-2) Resource Management Method According to this Embodiment

Next, a resource management method employed in the management server 3 according to this embodiment will be explained. In this embodiment, the user can designate, as configuration requirements for a requested resource, not only performance requirements, but also requirements relating to functions (hereinafter referred to as the "function requirements"). The management server 3 has a resource management function that searches for and allocates the resource that satisfies the user's request, based on the performance requirements and function requirements designated by the user.

The memory 11 for the management server 3 stores a resource management program 30 and a table group 40 as means for realizing resource management by the resource management function as shown in FIG. 1. The resource management program 30 is constituted from a request acquisition unit 31, a configuration acquisition unit 32, a search unit 33, a configuration unit 34, an allocation unit 35, a change detection unit 36, a release unit 37, and an interface unit 38. The table group 40 is constituted from a function table 41, a resource table 42, and a configuration table 43, and a request table 44.

The request acquisition unit 31 for the resource management program 30 is a program for obtaining performance requirements and configuration requirements for the resource configuration to be allocated to the user. The configuration acquisition unit 32 is a program for obtaining, for example, configuration information about each resource 6 belonging to the resource group 4. The search unit 33 is a program for searching the resource group 4 for the resource configuration that satisfies the performance requirements and function requirements designated by the user.

Furthermore, the configuration unit 34 is a program for configuring a function of a resource. The allocation unit 35 is a program for allocating the configured resource to the user. The change detection unit 36 is a program for detecting a configuration change of the resource.

Incidentally, the expression "to configure a function" herein means to package resources by combining one or more resources to exhibit one function. For example, a "cold standby" function is a function that when one of two or more serves is active, the other server(s) is turned off and made stand-by; and when the server which has been active is down, the other server(s) which has been held in a stand-by mode is activated and used instead of the failed server. At least two servers are necessary in order to realize this function. Therefore, "to configure a cold standby function" means to combine two or more servers as one package so that the cold standby function can be provided.

Furthermore, the release unit 37 is a program for releasing the allocation of a configured resource to the user. The interface unit 38 is a program for displaying necessary information and a GUI (Graphical User Interface) or a CLI (Command Line Interface) for the resource administrator to make various settings, on the output devices 15.

Meanwhile, the function table 41 is a table used to collectively manage the functions of the resources 6 constituting the resource group 4 and is composed of a "function" column 41A, a "main resource sharing" column 41B, and a "configuration condition" column 41C as shown in FIG. 3.

The "function" column 41A stores a function name of a function of any of the resources 6 constituting the resource group 4. The "main resource sharing" column 41B stores sharability information indicating whether the main resource is sharable or not.

The term "main resource" herein means a resource that serves as a subject providing the relevant function when such relevant function is configured. In this embodiment, the server 6 is the main resource. The user executes, for example, application programs on this server 6. Incidentally, the expression "to share the main resource" means to share the main resource among a plurality of users as in the case, for example, where a plurality of virtual servers (hereinafter referred to as the "virtual servers") operate on one server 6 using a server virtualization function and these virtual servers are used by different users.

The "configuration condition" column 41C is a field for managing necessary conditions to configure the relevant function and is composed of a "type" column 41D, a "required quantity" column 41E, and a "sharing" column 41F.

The "type" column 41D stores the type of the resource(s) or condition(s) that is necessary to configure the relevant function. For example, the server 6, the CPU 20 (FIG. 2) installed in the server 6, the memory 21 (FIG. 2), the auxiliary memory device 22 (FIG. 2), the I/O interface 23 (FIG. 2) such as an NIC, the program 24 (FIG. 2) such as a control program, a power source, and a UPS (Uninterruptible Power Source) are the "resource types." If the configuration condition depends on the environment where the resource is installed as in a case of an earthquake-proof function, the "type" column 41D stores, for example, an "earthquake-proof facility" as a condition of the installation environment.

The "required quantity" column 41E stores the required quantity of the resource(s) stored in the "type" column 41D. Incidentally, "+N" (N is an integer equal to or more than "1") in FIG. 3 means, in a case where the resource type stored in the "type" column 41D is a server 6, the quantity of required servers 6 other than the server 6 which is the main resource is "N." For example, FIG. 3 shows that a "cold standby" function requires "one" server in addition to the server 6 which is the main resource.

Furthermore, "−N" means the amount "N" of consumption of the resource stored in the "type" column 41D when the resource is, for example, the CPU 20 (FIG. 2) or the I/O interface 23 (FIG. 2) installed in the server 6. For example, FIG. 3 shows that regarding a "server virtualization 1" function, "0.5 GHz" is consumed in the operating frequency of the "CPU" installed in the main resource.

The number "1" in the "required quantity" column 41E means that in a case where the resource type stored in the "type" column 41D is software, it is necessary to distribute that software to the server 6 which is the main resource in order to configure the relevant function. For example, FIG. 3 shows that in order to configure a "software failure automatic reboot" function, it is necessary to distribute a "monitoring program" for detecting a software failure and automatically reboot the system, to the server 6 which is the main resource.

The number "0" in the "required quantity" column 41E means that a resource whose type is stored in the "type" column 41D is required to have been installed in the server 6 which is the main resource.

The "sharing" column 41F stores sharability information indicating whether or not the resource whose type is stored in the "type" column 41D can be shared with another main resource which configures the same function. The expression "sharable (or can be shared)" means that the server 6 which is added as a condition to configure a function installed in the server 6 which is the main resource can be also used when the same function is newly installed in another main resource. Accordingly, for example, as shown in FIG. 3, the server 6 which is added as a condition to install the "cold standby" function in the main resource can be also used as a server to be added as a condition to install the "cold standby" function in another main resource.

Incidentally, as a means for creating and updating the function table 41, it is possible to employ a method of using an API (Application Program Interface) or a CLI (Command Line Interface) provided by, for example, a management device for the resource group 4, a method of having the interface unit 28 provide, for example, a UI for the resource administrator to input information about functions, or a method of having the resource management program 30 obtain information from files.

The resource table 42 is a table used to manage each of the resources (the servers 6 in this example) constituting the resource group 4 and is composed of a "resource identifier" column 42A, a "performance" column 42B, a "function" column 42C, a "physical condition" column 42D, and a "cost" column 42E as shown in FIG. 4.

The "resource identifier" column 42A stores an identifier that is given to the relevant resource and is unique to that resource. Specifically speaking, a UUID (Universally Unique Identifier) or serial number of the server 6 and, in the case of a blade server, a chassis number or slot number of a chassis or slot where the blade servers is installed are used as the resource identifiers. Other names defined by the user may be used.

The "performance" column 42B stores performance information about the relevant resource. Specifically speaking, for example, the type, operating frequency, and quantity of cores of a CPU installed in that resource, the capacity of a memory, the type and quantity of installed NIC(s), and the type and quantity of installed HBA(s) are stored as the performance information about that resource.

The "function" column 42C stores a function(s) that the relevant resource has. Examples of the functions of the resource include a cold standby function, a network redundancy function, and an uninterruptible power supply function. The "physical condition" column 42D stores an installation site of the relevant resource. If the resource exists across a plurality of data center sites, this information is used to identify such data centers. If a region varies from site to site, a resource for a specific region can be identified based on this information.

The "cost" column 42E stores a cost required to use the relevant resource. The cost can include information such as operation and maintenance expenses and electric power expenses.

Meanwhile, the configuration table 43 is a table used to manage the configuration status of the resources and is composed of a "resource configuration identifier" column 43A, a "main resource" column 43B, a "performance" column 43C, a "configured function" column 43D, a "configuration condition resource" column 43E, and a "configuration condition sharing status" column 43F as shown in FIG. 5.

The "resource configuration identifier" column 43A stores an identifier given to the relevant function configuration (hereinafter referred to as the "resource configuration identifier"). The "main resource" column 43B stores an identifier of a main resource for the relevant resource configuration.

The "performance" column 43C stores performance information that the relevant resource configuration can provide. Incidentally, the performance of the relevant resource configuration which is stored in the "performance" column 43C is not necessarily identical to the performance of the main resource. For example, if the resource configuration is a virtual server, the performance of the server 6 which is the main resource may sometimes not be identical to the performance of the virtual server. The "configured function" column 43D stores a function name of a function that the relevant resource configuration exhibits. The relevant main resource is in the state capable of providing the function stored in this "configured function" column 43D.

The "configuration condition resource" column 43E stores a condition(s) for resource(s) used to configure the function stored in the "configured function" column 43D for the relevant resource configuration. A condition that starts with "+" in FIG. 5 means that the resource whose resource name is stored in the "configuration condition resource" column 43E is used when configuring the relevant resource configuration. Also, a condition that starts with "−" means that, from among the resources belonging to the main resource, the resource whose resource name is stored in the "configuration condition resource" column 43E is not used when configuring the relevant resource configuration.

For example, FIG. 5 shows that a "server 3" is used to configure the "cold standby" function of a "server 1," while "NIC 1" and "NIC 2" of a "server 5" are not used for the "network redundancy" function of the "server 5.".

Furthermore, the "configuration condition sharing status" column 43F stores the sharing status of the resource(s) stored in the "configuration condition resource" column 43E. In an example of "configuration 1" in FIG. 5, it is shown that a "server 3" which is necessary for the "cold standby" function is shared with "configuration 2."

Meanwhile, the request table 44 is a table used to manage resource requests that are given from the interface unit 38 (FIG. 1) to the request acquisition unit 31 (FIG. 1) according to operation input by the resource administrator and is composed of a "request identifier" column 44A, a "performance requirement" column 44B, a "function requirement" column 44C, a "resource-allocated user" column 44D, a "main resource sharing" column 44E, a "function configuration resource sharing" column 44F, and a "resource configuration allocated to user" column 44G as shown in FIG. 6.

The "request identifier" column 44A stores an identifier (request identifier) given to the relevant resource request which has been sent from the interface unit 38 to the request acquisition unit 31. The "performance requirement" column 44B and the "function requirement" column 44C store performance requirements and function requirements for the resource as requested by the relevant resource request. The "resource-allocated user" column 44D stores an identifier of a user to which the resource is allocated and is designated by the resource request. Incidentally, this user may be a single user or a set of users.

The "main resource sharing" column 44E stores information indicating whether the main resource designated by the relevant resource request can be shared with other users. The "function configuration resource sharing" column 44F stores information indicating whether sharing the resource(s) which is designated by the relevant resource request and is necessary to configure the function designated by the resource request should be permitted or not.

The "resource configuration allocated to user" column 44G stores a resource configuration identifier of the resource configuration allocated to the relevant user in response to the relevant resource request. This identifier corresponds to the resource configuration identifier stored in the "resource configuration identifier" column 43A in the configuration table 43 which was explained above with reference to FIG. 5. Incidentally, if a resource configuration is not allocated to the relevant user yet in response to the resource request, the "resource configuration allocated to user" column 44G stores information indicating "unallocated."

(1-3) Processing by Resource Management Program

Next, the details of processing executed by the resource management program 30 relating to the resource management method according to this embodiment will be explained. Incidentally, the following explanation is given, assuming that a processing subject of various processing is the request acquisition unit 31, the configuration acquisition unit 32, the search unit 33, the configuration unit 34, the allocation unit 35, the change detection unit 36, the release unit 37, or the interface unit 38, all of which constitute the resource management program 30; however, it is a matter of course that in fact, the processing is executed by the CPU 10 (FIG. 1) for the management server 3 (FIG. 1) based on the request acquisition unit 31, the configuration acquisition unit 32, the search unit 33, the configuration unit 34, the allocation unit 35, the change detection unit 36, the release unit 37, or the interface unit 38.

Figure 7:
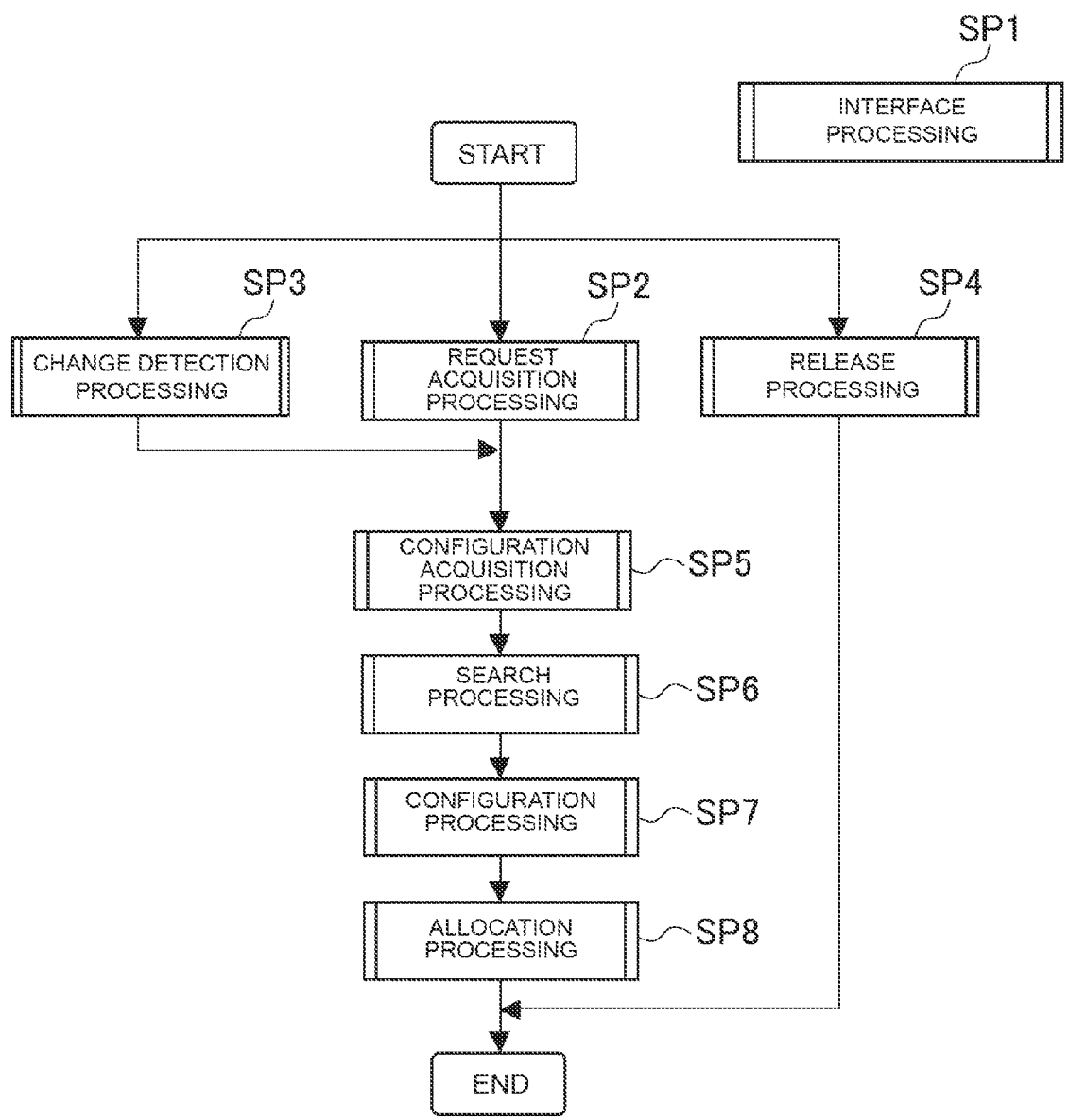
FIG. 7 is a flowchart illustrating a flow of resource management processing executed according to a resource management program.

FIG. 7 shows a flow of a processing sequence executed by the request acquisition unit 31, the configuration acquisition unit 32, the search unit 33, the configuration unit 34, the allocation unit 35, the change detection unit 36, the release unit 37, and the interface unit 38 for the resource management program 30 with regard to the resource management by the resource management method according to this embodiment.

The starting point of this processing sequence is any one of request acquisition processing (SP2) executed by the request acquisition unit 31, change detection processing (SP3) executed by the change detection unit 36, and release processing (SP4) executed by the release unit 37. The request acquisition unit 31 and the release unit 37 start the request acquisition processing and the release processing when a UI (User Interface) provided by the interface unit 38 is activated or when specified operation input is entered to the UI. The change detection unit 36 starts the change detection processing when it detects a configuration change of any of the resources 6 in the resource group 4.

Subsequently, configuration acquisition processing (SP5) by the configuration acquisition unit 32, search processing (SP6) by the search unit 33, configuration processing (SP7) by the configuration unit 34, and allocation processing (SP8) by the allocation unit 35 are executed sequentially. Incidentally, the flow of processing does not necessarily follow this flow; and in some cases, the next processing may be skipped or the flow may be terminated without proceeding to the next processing depending on conditions.

The interface unit 38 provides the resource administrator with a necessary UI in response to, for example, the operation input entered via the input devices 14 (FIG. 1). Meanwhile, if a command to display a resource allocation setting screen 50 described later with reference to FIG. 8 is input, the interface unit 38 activates the request acquisition unit 31; and if a command to display a resource configuration release screen (not shown) to release the resource configuration is input, the interface unit 38 activates the release unit 37 (SP1).

(1-3-1) Processing by Interface Unit

Figure 8:
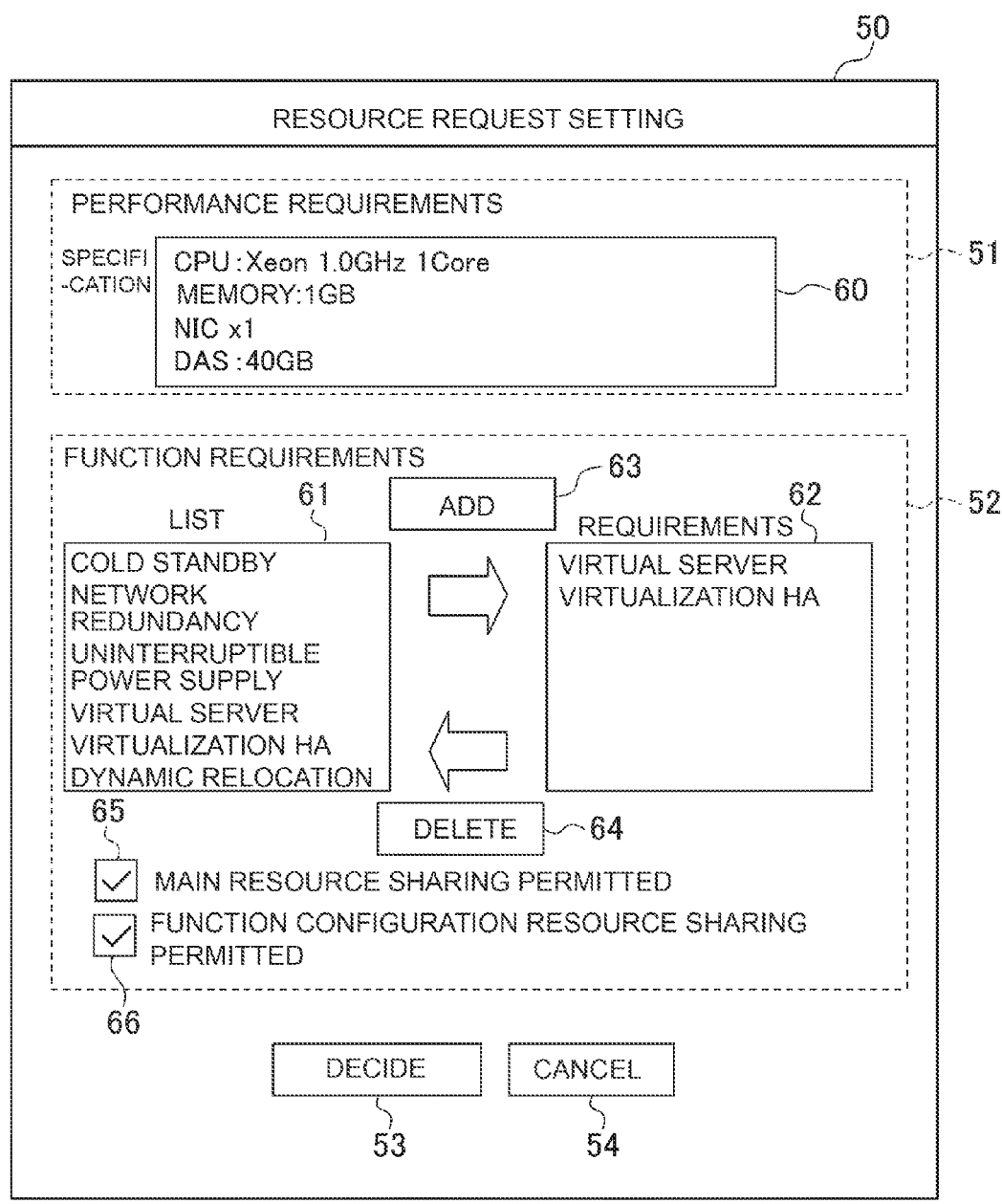
FIG. 8 is a schematic diagram showing the outline configuration of a resource request setting screen.

FIG. 8 shows a configuration example of the resource allocation setting screen 50 provided by the interface unit 38. This resource allocation setting screen 50 is a UI used by the resource administrator in response to a request from a user (hereinafter referred to as the "target user") to make settings to allocate resources to the target user. This resource allocation setting screen 50 is displayed on, for example, the output devices 15 for the management server 3 or output devices for other terminals connected via a network to the management server 3, using, for example, a browser or a dedicated program provided in the terminals.

As is obvious from FIG. 8, the resource allocation setting screen 50 is composed of a performance requirement designation area 51 and a function requirement designation area 52. The performance requirement designation area 51 includes a performance request input part 60; and performance requirements for the resource that the resource administrator intents to allocate to the target user in response to a request from the target user can be input to this performance request input part 60 via the input devices 14.

The function requirement designation area 52 includes a function list display part 61 and a selected function display part 62. The function list display part 61 displays a list of functions that any of the resources (servers 6) constituting the resource group 4 has. The selected function display part 62 displays functions selected by the resource administrator as functions to be allocated to the target user from among the functions displayed in the function list display part 61. The interface unit 38 obtains information to be displayed in the function list display part 61, from the function table 41 (FIG. 3) and the resource table 42 (FIG. 4).

An addition button 63 and a deletion button 64 are buttons used respectively to move the function(s) selected by the resource administrator from the functions displayed in the function list display part 61 to the selected function display part 62, or return the functions displayed in the selected function display part 62 back to the function list display part 61.

A first check box 65 is used to set whether sharing the main resource with other users should be permitted or not; and if the sharing is permitted, a check mark is displayed in the first check box 65. Furthermore, a second check box 66 is used to set whether sharing resources(s), which is necessary to configure the function(s) displayed in the selected function display part 62, with other users should be permitted or not; and if the sharing is permitted, a check mark is displayed in the second check box 66.

On the resource allocation setting screen 50, requirements for the performance of the resource to be allocated to the target user (hereinafter referred to be as the "performance requirement(s)") are input in the performance request input part 60 of the performance requirement designation area 51 and also requirements for the functions requested for the relevant resource (hereinafter referred to as the "function requirement(s)") are displayed in the selected function display part 62 of the function requirement designation area 52, and then the decision button 53 is clicked, so that the performance requirements and the function requirements can be set. The performance requirements and function requirements which are set at that time as well as information such as a user name of the target user are sent as a resource request to the request acquisition unit 31. Furthermore, all the operations performed on the resource allocation setting screen 50 can be cancelled by clicking the cancellation button 54 on the resource allocation setting screen 50.

(1-3-2) Processing by Request Acquisition Unit

Figure 9:
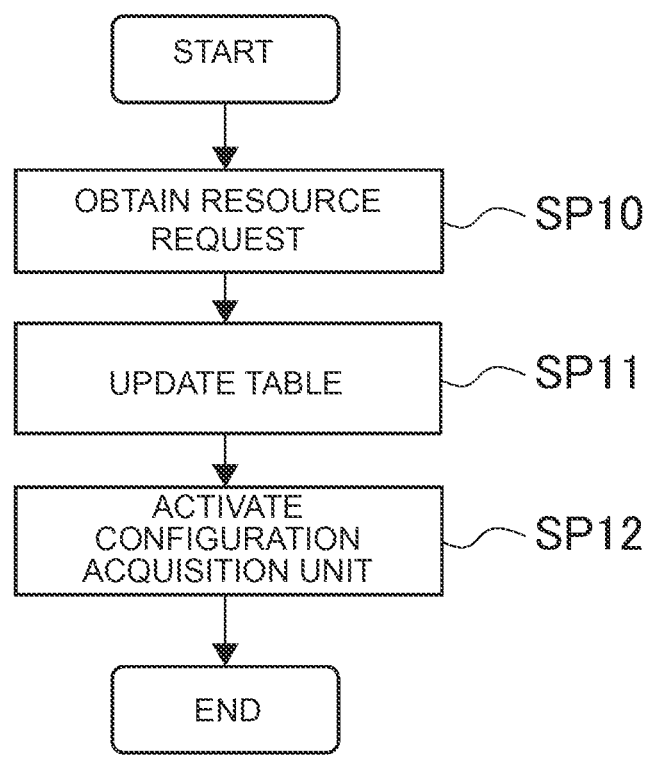
FIG. 9 is a flowchart illustrating a processing sequence of request acquisition processing.

FIG. 9 shows a processing sequence of request acquisition processing executed by the request acquisition unit 31. After the request acquisition unit 31 is activated by the interface unit 38, it starts this request acquisition processing and then obtains the above-described resource request from the interface unit 38 (SP10).

Subsequently, the request acquisition unit 31 registers information, which is included in the obtained resource request, about the performance requirements, the function requirements, the target user identifier, sharability of the main resource, and sharability of the function configuration resource, in the request table 44 (FIG. 6) (SP11). If the request table 44 does not exist when the above registration is to be performed, the request acquisition unit 31 also creates the request table 44. Next, the request acquisition unit 31 activates the configuration acquisition unit 32 (SP12) and then terminates this request acquisition processing.

(1-3-3) Processing by Configuration Acquisition Unit

Figure 10:
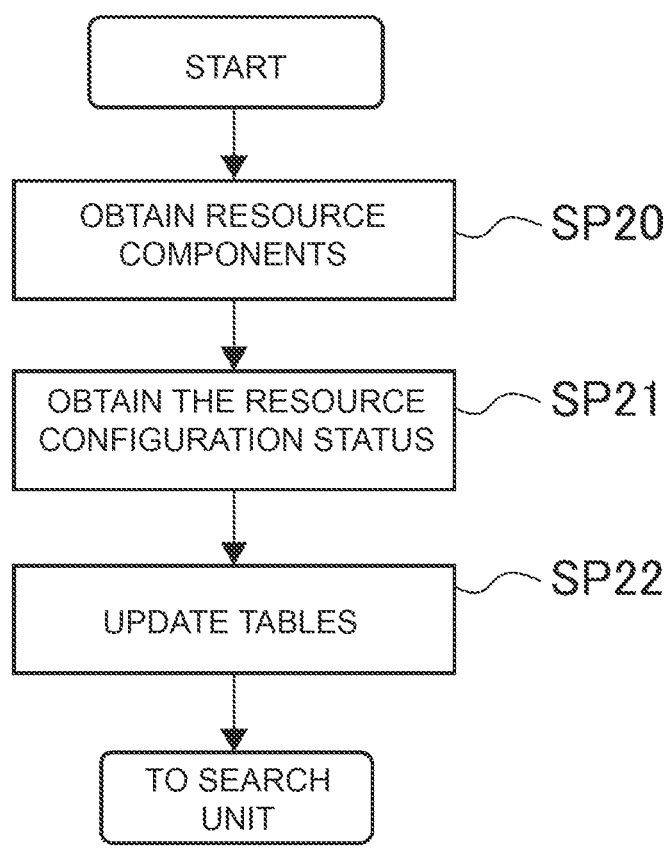
FIG. 10 is a flowchart illustrating a processing sequence of configuration acquisition processing.

FIG. 10 shows a processing sequence of configuration acquisition processing executed by the configuration acquisition unit 32 activated in step SP12 of the request acquisition processing (FIG. 9). After the configuration acquisition unit 32 is activated by the request acquisition unit 31, it starts this configuration acquisition processing and first obtains information about components of each of the resources constituting the resource group 4 (information stored in the "performance" column 42B, the "function" column 42C, the "physical condition" column 42D, and the "cost" column 42E of the resource table 42 described earlier with reference to FIG. 4) (SP20). The configuration acquisition unit 32 also obtains the configuration status of functions of each of the resources constituting the resource group 4 (information stored the "main resource" column 43B, the "performance" column 43C, the "configured function" column 43D, and the "configuration condition resource" column 43E of the configuration table 43 described earlier with reference to FIG. 5) (SP21).

Incidentally, as a means for the configuration acquisition unit 32 to obtain the information about each resource constituting the resource group 4 in step SP20 and step SP21 described above, it is possible to employ a method of using an API (Application Program Interface) or a CLI (Command Line Interface) provided by, for example, a management device for the resource group 4, a method of having the interface unit 28 provide, for example, a UI for the resource administrator to input information about functions, or a method of having the resource management program 30 obtain information from files.

Next, the configuration acquisition unit 32 registers the information, which was obtained in step SP20 and step SP21, in the resource table 42 and the configuration table 43, respectively (SP22). If the resource table 42 and/or the configuration table 43 does not exist when the above registration is to be performed, the configuration acquisition unit 32 also creates the resource table 42 and/or the configuration table 43. The configuration acquisition unit 32 then terminates this configuration acquisition processing.

(1-3-4) Processing by Search Unit

Figure 11:
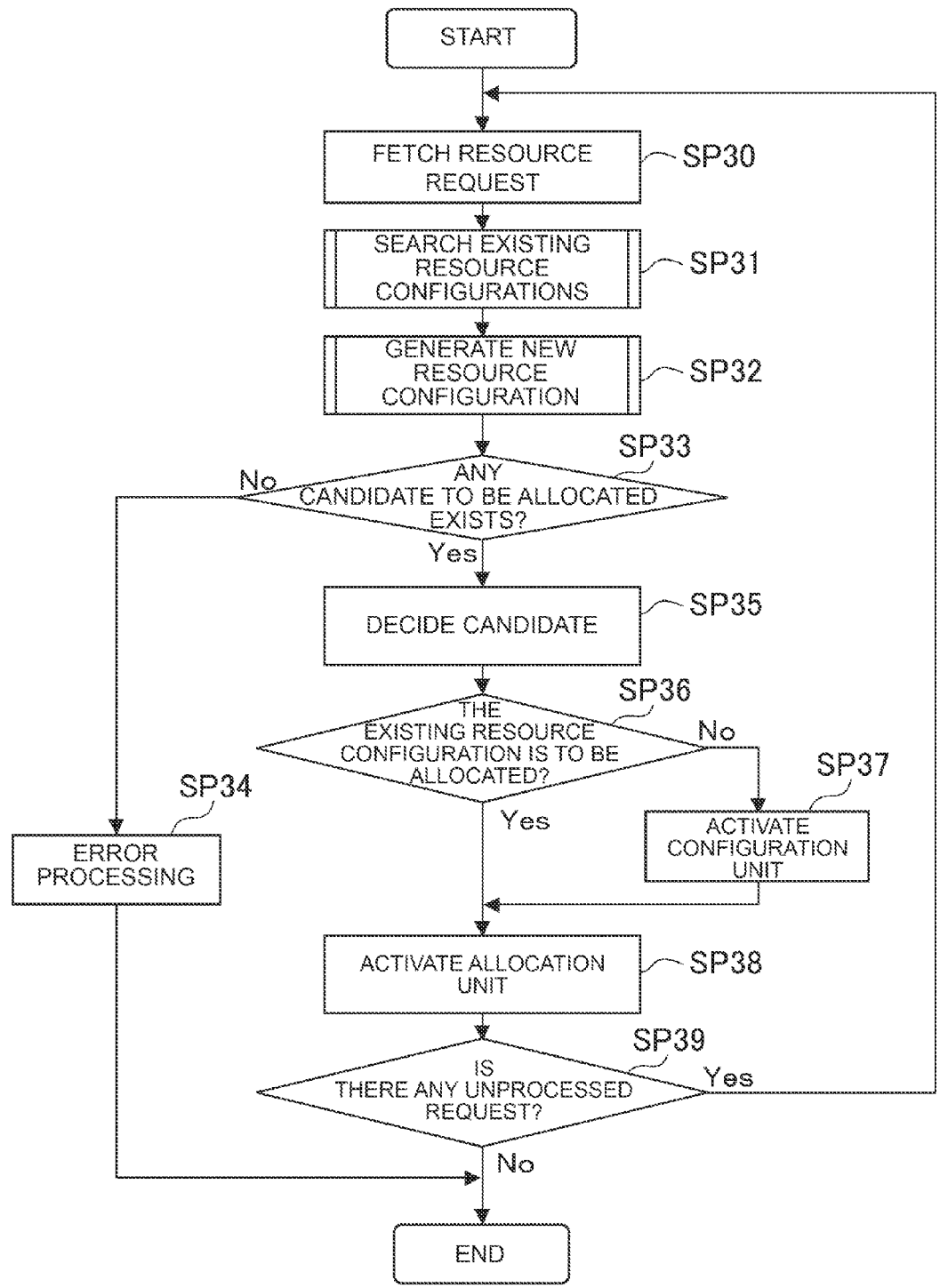
FIG. 11 is a flowchart illustrating a processing sequence of search processing.

FIG. 11 shows a processing sequence of search processing executed by the search unit 33. The search unit 33 executes this search processing regularly or irregularly, so that it searches the resource group 4 for a resource configuration that satisfies the performance requirements and function requirements requested by an unprocessed resource request registered in the request table 44.

Specifically speaking, after starting this search processing, the search unit 33 first reads, from among resource requests registered in the request table 44, a resource request to which any resource configuration is not allocated yet (a resource request for which the "resource configuration allocated to user" column 44G of the request table 44 stores "unallocated") (SP30), and searches existing resource configurations (hereinafter referred to as the "existing resource configurations" when necessary) for a resource configuration that satisfies the performance requirements and function requirements requested by that resource request (SP31).

Next, the search unit 33 configures a new resource configuration that satisfies the performance requirements and function requirements requested by the resource request (SP32). Then, as a result of the processing in step SP31 and step SP32, the search unit 33 judges whether or not there is any resource configuration that can be a candidate to be allocated to the target user (hereinafter referred to as the "resource configuration candidate") (SP33).

If step SP33 returns a negative judgment, the search unit 33 sends a specified error notice to the interface unit 38 (SP34) and then terminates this search processing. As a result, based on the above error notice, the interface unit 38 displays an error message on the output devices 15, stating that no existing or new resource configuration that satisfies the performance requirements and function requirements requested by the relevant resource request exits.

On the other hand, if step SP33 returns an affirmative judgment, the search unit 33 decides one resource configuration to be allocated to the target user from among the resource configuration candidates (SP35). In this embodiment, the above decision is made by referring to the "cost" column 42E of the resource table 42, calculating, for each resource configuration candidate, a sum of costs for each resource included in the relevant resource configuration candidate as the cost for that resource configuration candidate and deciding the resource configuration candidate whose calculated cost is the lowest to be the resource configuration to be allocated to the target user.

Subsequently, the search unit 33 judges whether the resource configuration decided in step SP35 is an existing resource configuration or not (SP36). If step SP36 returns a negative judgment, the search unit 33 activates the configuration unit 34 (SP37); and if the configuration processing (FIG. 15) by the configuration unit 34 terminates, the search unit 33 proceeds to step SP38.

On the other hand, if step SP36 returns an affirmative judgment, or if the configuration processing by the configuration unit 34 activated in step SP37 terminates, the search unit 33 activates the allocation unit 35 (SP38).

After the allocation processing (FIG. 16) by the allocation unit 35 terminates, the search unit 33 judges whether or not there is any unprocessed resource request left in the request table 44 (SP39). If step SP39 returns an affirmative judgment, the search unit 33 returns to step SP30 and then repeats the processing from step 30 to step SP39.

Then, when there is no unprocessed resource request left in the request table 44 and step SP39 finally returns a negative judgment, the search unit 33 terminates this search processing.

Figure 12:
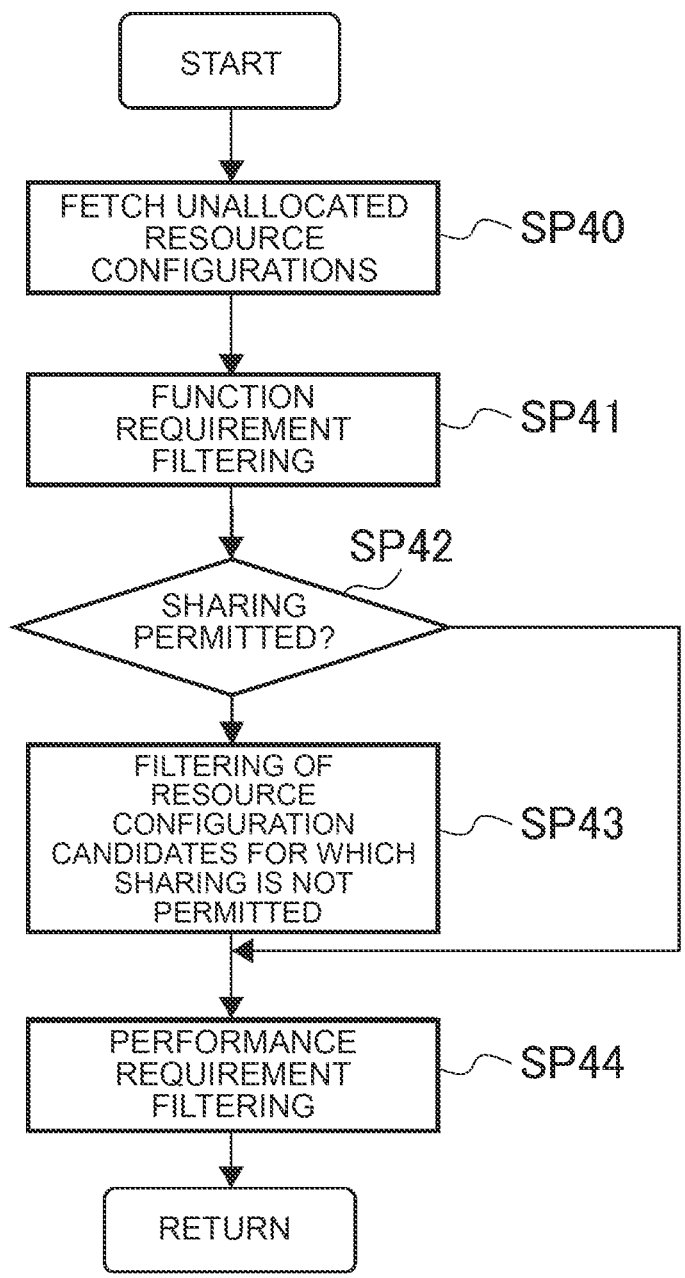
FIG. 12 is a flowchart illustrating a processing sequence of existing resource configuration search processing.

Incidentally, FIG. 12 shows the details of the processing in step SP 31 of the search processing by the search unit 33. After proceeding to step SP31 of the search processing, the search unit 33 starts this existing resource configuration search processing and first extracts all the resource configurations which are not allocated to the user yet (unallocated resource configurations) from among the existing resource configurations registered in the configuration table 43 (FIG. 5) (SP40).

Next, the search unit 33 extracts, from the existing resource configurations extracted in step SP40, the existing resource configurations that satisfy all the function requirements requested by the relevant resource request which was obtained in step SP30 in FIG. 11 (hereinafter referred to as the "target resource request"). The word "satisfy" herein means that the existing resource configuration is equipped with all the function items of the function requirements requested by the target resource request. For example, if the function requirements requested by the target resource request are "network redundancy" and "uninterruptible power supply," the search unit 33 refers to the "configured function" column 43D of the configuration table 43 and extracts all the existing resource configurations that have both of these functions (SP41).

Subsequently, the search unit 33 refers to the "main resource sharing" column 44E and the "function configuration resource sharing" column 44F of the request table 44 (FIG. 6) for entries corresponding to the target resource request and checks if sharing both the main resource and the function configuration resource with other users is permitted or not in the target resource request (SP42).

If step SP42 returns an affirmative judgment, the search unit 33 proceeds to step SP44; and if step SP42 returns a negative judgment, the search unit 33 deletes unnecessary existing resource configurations from the existing resource configurations, which are candidates, extracted in step SP41 (SP43). Specifically speaking, if sharing the main resource is not permitted in the target resource request, the search unit 33 deletes the existing resource configurations whose main resource is used as a main resource for other existing resource configurations, from the existing resource configurations which were extracted in step SP41 and are resource configuration candidates. Furthermore, if sharing the function configuration resource is not permitted, the search unit 33 deletes, from the remaining resource configuration candidates, the existing resource configurations whose function configuration resource(s) is shared with other resource configurations (the existing resource configurations for which the "configuration condition sharing status" column 43F of the configuration table 43 stores "shared").

Subsequently, the search unit 33 selects the existing resource configuration(s) that satisfies the performance requirements requested by the target resource request, from among the currently remaining resource configuration candidates; and the search unit 33 determines the then existing resource configuration(s) as the resource configuration candidate(s) (SP44). The search unit 33 then terminates this existing resource configuration search processing.

Figure 13:
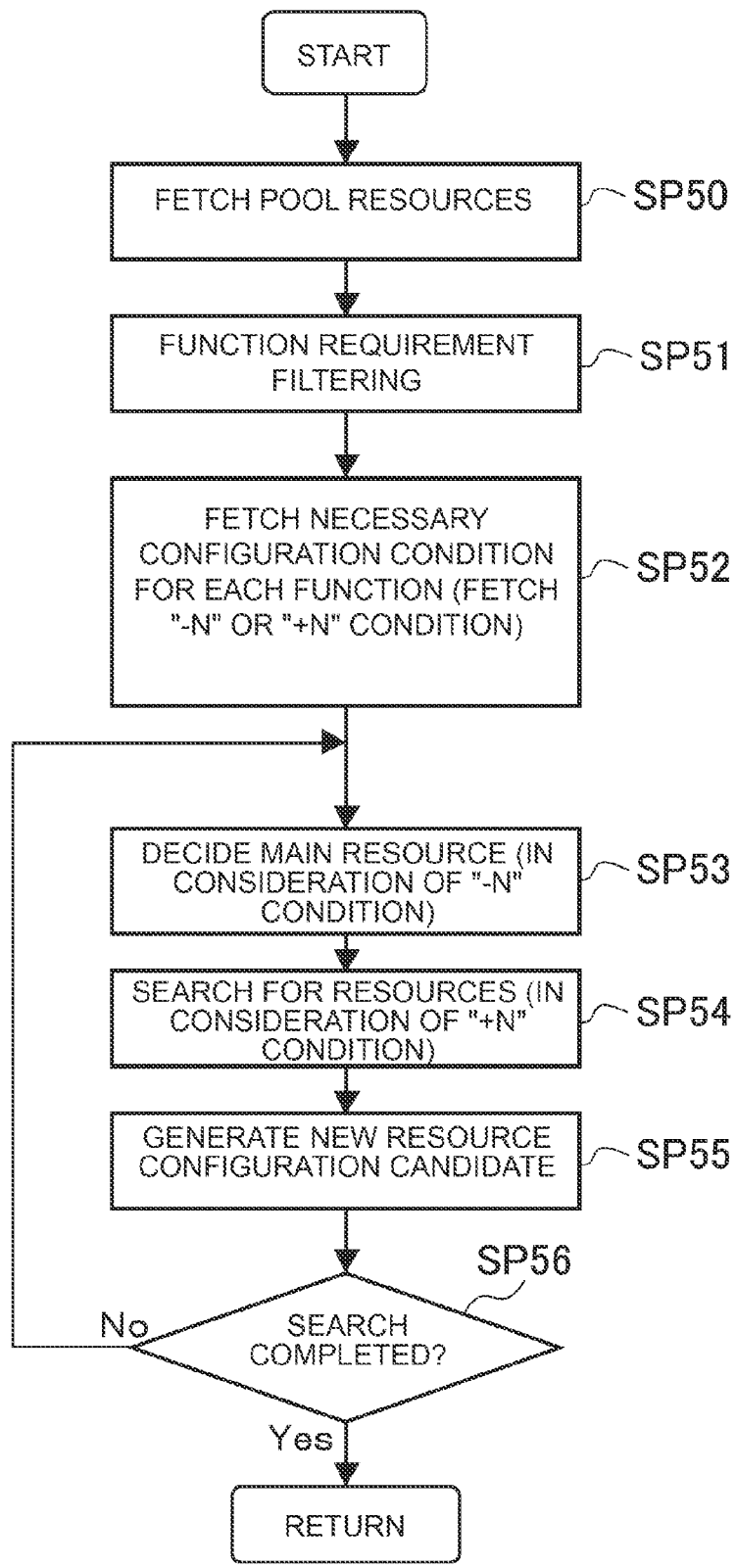
FIG. 13 is a flowchart illustrating a processing sequence of new resource configuration search processing.

FIG. 13 shows the details of the processing in step SP 32 in the search processing (FIG. 11) by the search unit 33. After proceeding to step 32 in the search processing, the search unit 33 starts this new resource configuration search processing and first fetches the pooled resources (SP50). The expression "pooled resource(s)" means the resource(s) which is not allocated to the user yet, from among the resources registered in the resource table 42. Even if a resource is included in any of the resource configurations, if that resource configuration is not allocated to the user yet, that resource is also considered to be a pooled resource. Also, a resource not included in the resource configuration is a pooled resource. However, if sharing the main resource is permitted in the target resource request, the main resource (the main resource stored in the "main resource" column 43B for the relevant entry in the configuration table 43 described earlier with reference to FIG. 5) included in the resource configuration that supports the function for which the main source is sharable (the function regarding which the sharability information stored in the "main resource sharing" column 41B of the function table 41 described earlier with reference to FIG. 3 is "possible") is added to the pooled resources.

Next, the search unit 33 extracts a resource(s) that satisfies all the function requirements designated by the target resource request, from among the pooled resources (SP51). The word "satisfy" means that the relevant resource is equipped with all the function items of the function requirements requested by the target resource request. For example, if the function requirements requested by the target resource request are "network redundancy" and "uninterruptible power supply," the search unit 33 refers to the "function" column 42C for the relevant entry in the resource table 42 and then extracts all the resources that have both of these functions.

Next, the search unit 33 obtains a configuration condition (s) for each function of the function requirements requested by the target resource request, from the function table 41 and fetches the configuration conditions stored in the "required quantity" column 41E for the relevant entry in the function table 41 (specifically speaking, information indicating "+N" [N is an integer equal to or more than "1"] or "−N") as the resource condition for that function (SP52).

Subsequently, the search unit 33 selects the main resource from among all the resources extracted in step SP51 (SP53). Specifically speaking, the search unit 33 refers to the "performance" column 42B for the relevant entry in the resource table 42, compares the performance of each resource extracted in step SP51 with the performance requirements requested by the target resource request, and selects one resource as the main resource from among the resources that satisfy the performance requirements requested by the target resource request.

Incidentally, the word "satisfy" means that the performance of the resource is equal to or higher than the performance requirements of the resource request. However, if the resource conditions for the function in step SP51 includes "−N," the resultant performance obtained by subtracting all the "−N" values in the resource conditions from the above-mentioned resource performance needs to satisfy the performance requirements of the target resource request. For example, if the operating frequency of the CPU in the resource performance is "3.0 GHz" and the resource condition "−N" is "−CPU: 0.5 GHz," the result "2.5 GHz" obtained by subtracting "0.5 GHz" from the resource performance "3.0 GHz" needs to satisfy the performance requirements.

Then, the search unit 33 searches for "N" servers 6 (N=quantity of the servers 6) that satisfy the condition "−N" from among the resource conditions for each function, which were fetched in step SP52 (SP54). Then, the search unit 33 selects "N" resources (which means the severs 6) other than the main resource selected in step SP53, from among the pooled resources with respect to the resource condition "+N" for each function. However, if both the following conditions (1) and (2) are satisfied, the search unit 33 refers to the configuration table 43 for the existing resource configurations which have configured the relevant function, and then prioritizes selection of "N" resources from the configuration condition resources for the relevant resource configuration (the resources stored in the "configuration condition resource" column 43E of the configuration table 43):

(1) sharing the function configuration resource is permitted in the relevant resource request; and
(2) sharability of the configuration condition for the function (sharability stored in the "sharing" column 41F of the function table 41) is "possible."

Subsequently, the search unit 33 generates a new resource configuration as a resource configuration candidate by using the resource selected in step SP53 as "the main resource" and using the function selected in step SP54 and the resources which satisfies the resource conditions for each function as the "function" of the main resource and the "configuration condition resources" (SP55). When this is done, if a candidate for the new resource configuration uses the main resource included in the existing resource configuration, the existing resource configuration is first released to generate the new resource configuration. Therefore, an "existing resource configuration release flag" for indicating whether or not it is necessary to release the existing resource configuration, is given to the new resource configuration.

Next, the search unit 33 judges whether or not it has finished generating a reasonable number of resource configuration candidates for the relevant resource requirement (SP56). If step SP56 returns a negative judgment, the search unit 33 returns to step SP53 and then repeats the processing from step SP53 to step SP56. When this happens, the search unit 33 generates a new resource configuration candidate for which a combination of the main resource and the configuration condition resources for the function is different from those for the already generated resource configuration candidates.

As a means for selecting a reasonable number of the resource configuration candidates, for example, selection of the resource configuration candidates may be continued until all the possible resource configuration candidates that can be obtained are generated, or the top three new resource configurations whose main resource performance is close to the performance requirements requested by the target resource request may be selected as the resource configuration candidates. Furthermore, it is also possible to adopt, for example, a method of selecting the resource configuration candidates by focusing on the resource configurations that are not included in the function requirements designated by the target resource request, but have a virtual server function.

When the search unit 33 finishes generating a reasonable number of the resource configuration candidates or can no longer generate any more resource configuration candidates, it terminates this new resource configuration search processing and returns to the search processing described earlier with reference to FIG. 11.

In step SP35 of the search processing described earlier with reference to FIG. 11, a UI that shows the resource configuration candidates for the existing resource configurations and the resource configuration candidates for the new resource configurations (hereinafter referred to as the "resource configuration candidate selection screen") may be displayed on the output devices 15 and information such as costs of these resource configuration candidates may also be displayed on the resource configuration candidate selection screen, so that the resource administrator can select the resource configuration to be allocated to the user from among the resource configuration candidates indicated on this resource configuration candidate selection screen.

Figure 14:
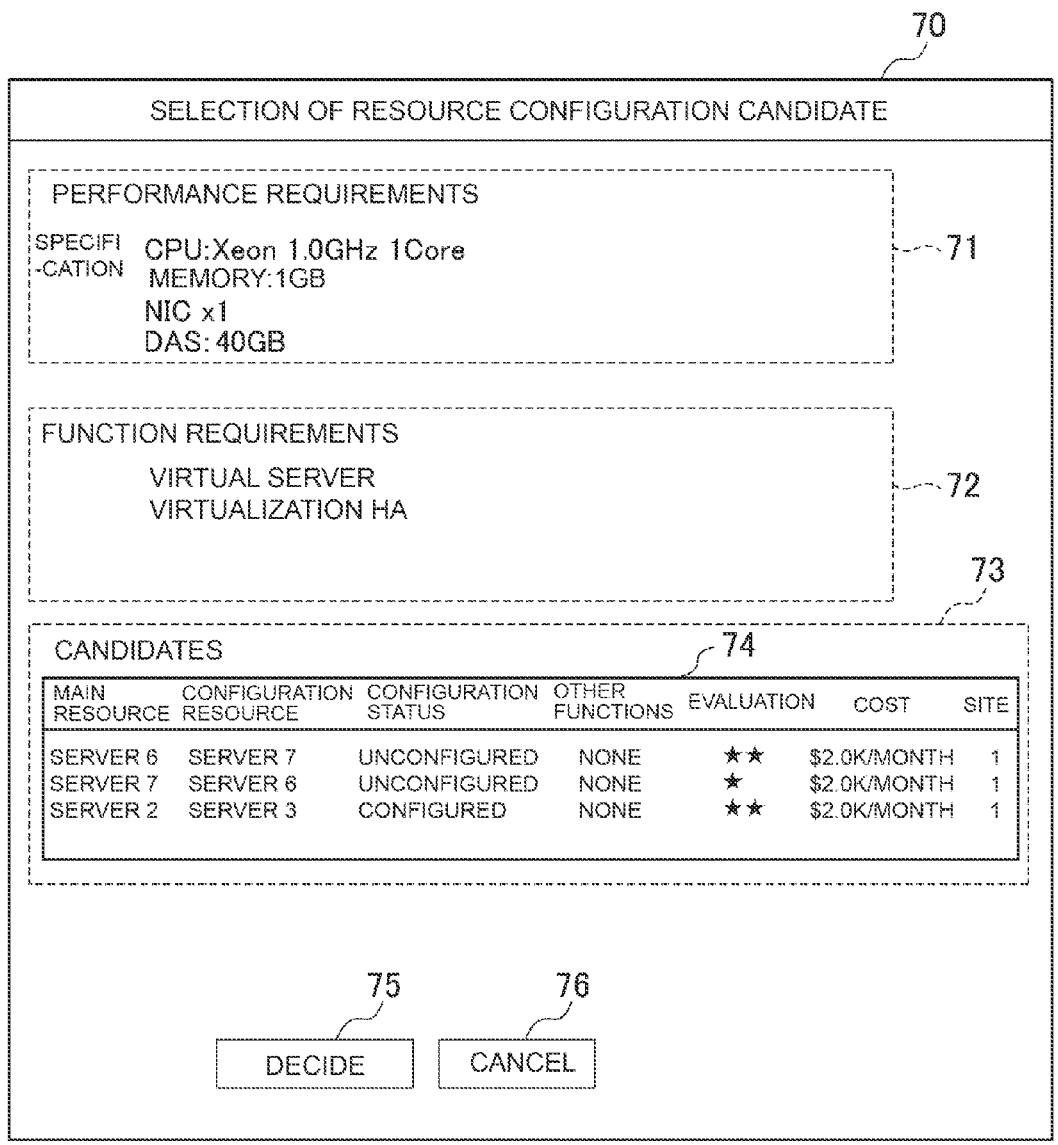
FIG. 14 is a schematic diagram showing the outline configuration of a resource configuration candidate selection screen.

FIG. 14 shows a configuration example of such a resource configuration candidate selection screen. A resource configuration candidate selection screen 70 shown in FIG. 14 is composed of a performance requirement display area 71, a function requirement display area 72, and a candidate display area 73. The performance requirements and function requirements requested by the target resource request are displayed in the performance requirement display area 71 and the function requirement display area 72, respectively.

The candidate display area 73 includes a resource configuration candidate display part 74; and some resource configuration candidates detected by the aforementioned search processing are displayed in a list form in this resource configuration candidate display part 74. In this list, a "main resource" column, which is a among display item, displays an identifier of the main resource for the relevant resource configuration candidate.

Also, a "configuration resource" column of this list displays a resource that is a function configuration condition for the relevant resource configuration candidate. Specifically speaking, in the case of an existing resource configuration, a resource that starts with "+" from among the resources in the "configuration condition resource" column 43E of the configuration table 43 is displayed in the "configuration resource" column; and in the case of a new resource configuration, a resource added to the new resource configuration according to the resource condition in step SP54 of the new resource configuration search processing described earlier with reference to FIG. 13 is displayed in the "configuration resource" column. If the configuration resource is to be shared with other users, information such as "server 7 (shared)" is displayed.

Furthermore, a "configuration status" column of this list displays a letter string "configured" when the relevant resource configuration candidate is an existing resource configuration; and the "configuration status" column displays a letter string "unconfigured" in the case of a new resource configuration. However, if that resource configuration candidate is a new resource configuration and has the existing resource configuration release flag which was given in step SP55 of the new resource configuration search processing, the "configuration status" column displays a letter string such as "unconfigured (release required)."

Furthermore, if the relevant resource configuration candidate has a function that is not included in the function requirements designated by the target resource request, an "other functions" column of this list displays a function name of that function. Incidentally, if there is no such function, the "other functions" column displays a letter string "none."

Meanwhile, an "evaluation" column of this list displays a recommendation level of the relevant resource configuration candidate, using, for example, the quantity of "★" mark(s). As a means for displaying the recommendation level, it is possible to adopt a method of referring to, for example, a difference between the cost calculated in step SP35 of the search processing (FIG. 11) as well as the performance requirements and function requirements of the target resource request, and the performance and functions of the relevant resource configuration candidate and giving more "★" marks for the smaller difference.

A "cost" column of this list displays the cost calculated in step SP35 of the search processing (FIG. 11). A "site" column displays an installation site of the resource included in the relevant resource configuration candidate. In this case, the "site" column basically displays the installation site of the main resource; however, an installation site of the "configuration resource" may also be displayed.

On this resource configuration candidate selection screen 70, one desirable resource configuration candidate can be selected from among the resource configuration candidates displayed in the resource configuration candidate display part 74; and the resource configuration candidate then selected can be decided as the resource configuration to be allocated to the target user by clicking a decision button 75 displayed at the bottom of the screen. In this case, this decision is reported to the search unit 33. Furthermore, it is possible to cancel all the operations performed on the resource configuration candidate selection screen 70 at that time by clicking a cancellation button 76 at the bottom of the resource configuration candidate selection screen 70.

(1-3-5) Processing by Configuration Unit

Figure 15:
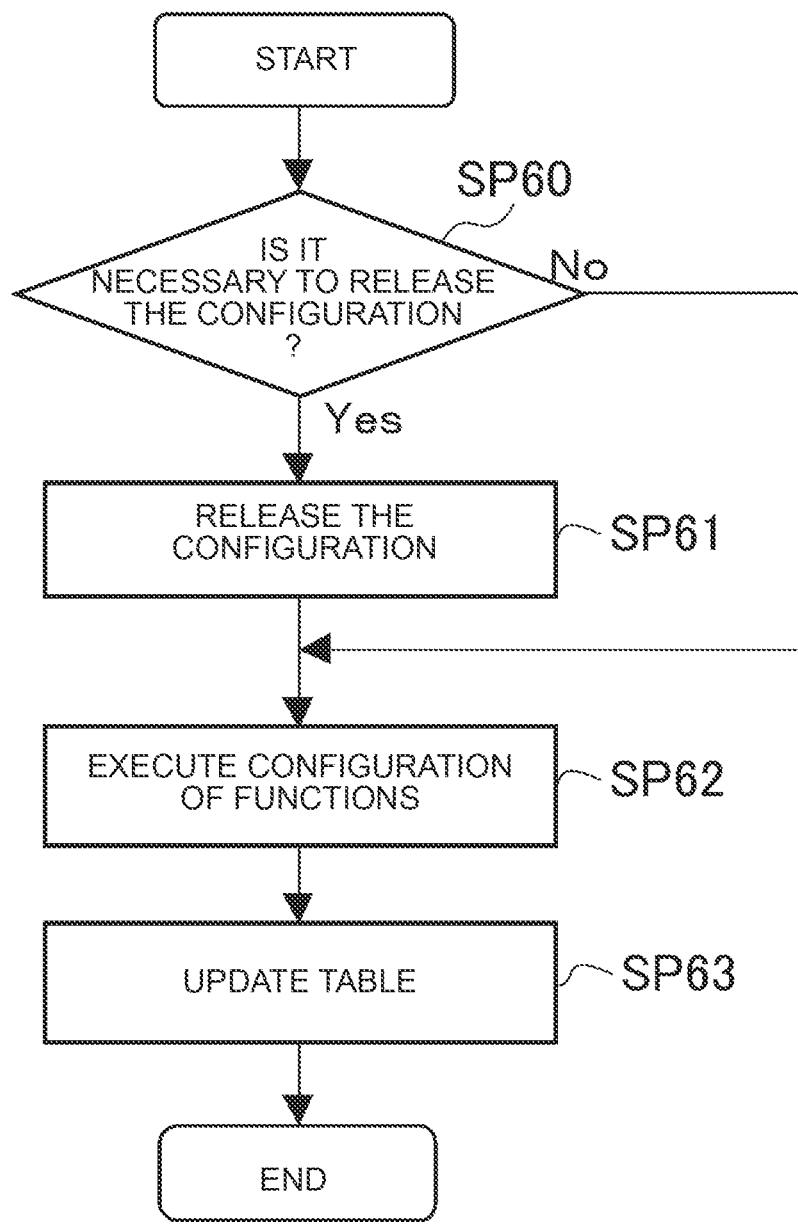
FIG. 15 is a flowchart illustrating a processing sequence of configuration processing.

FIG. 15 shows the details of the configuration processing executed by the configuration unit 34 activated in step SP37 of the search processing (FIG. 11). If it is necessary to generate the resource configuration which is decided to be allocated to the target user in step SP35 of the search processing, the configuration unit 34 newly configures that resource configuration by executing this configuration processing after the activation processing.

Specifically speaking, after starting this configuration processing, the configuration unit 34 first judges whether or not the existing resource configuration release flag (see the explanation about step SP55 of the new resource configuration search processing with reference to FIG. 13) is given to the resource configuration candidate which was decided in step SP35 of the search processing (FIG. 11) to be the resource configuration to be allocated to the target user in response to the target resource request (SP60).

If step SP60 returns a negative judgment, the configuration unit 34 proceeds to step SP62; and if step SP60 returns an affirmative judgment, the configuration unit 34 releases the existing resource configuration whose main resource is the resource to be used by the relevant resource configuration (SP61). Incidentally, as a means for releasing the existing resource configuration, it is possible to employ a method of using an API or a CLI provided by, for example, a management device for the resource group 4 included in the resource configuration to be released in order to perform the release operation, or a method of displaying the resources and functions of the resource configuration to be released on the output devices, thereby allowing the resource administrator to perform the release operation based on that display.

Subsequently, the configuration unit 34 executes processing to configure the function based on the content of the relevant resource configuration (SP62). In order to execute the processing to configure each function to be configured for the relevant resource configuration, an API or a CLI provided by, for example, the relevant resource management device is used to configure the function with regard to the configuration conditions for the main resource and function included in the resource configuration. However, the interface unit 38 may display the resource and function to be configured on the output devices 15, so that the resource administrator can execute the processing to configure the function based on the displayed information.

Next, the configuration unit 34 adds the resource configuration newly configured in step SP62 to, and registers it in, the configuration table 43 and also deletes the resource configuration released in step SP61 from the configuration table 43 (SP63). Then, the configuration unit 34 terminates this configuration processing.

(1-3-6) Processing by Allocation Unit

Figure 16:
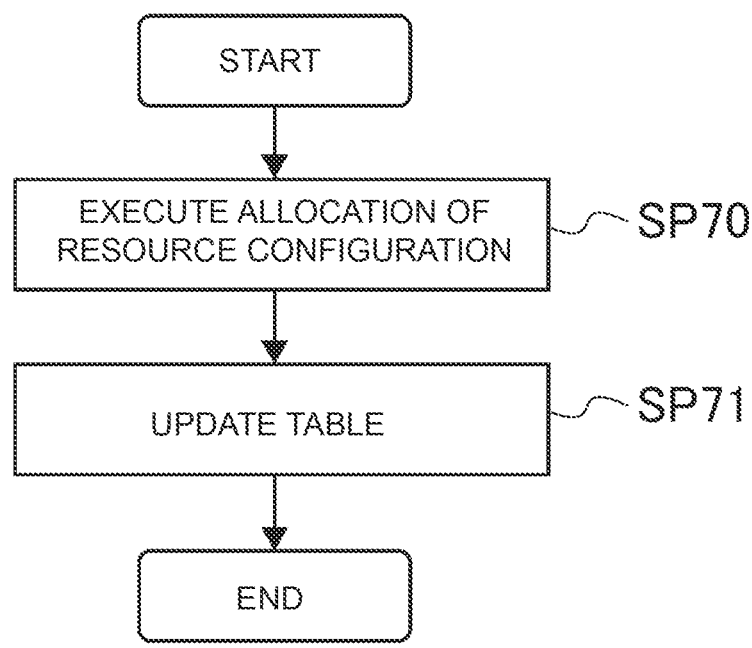
FIG. 16 is a flowchart illustrating a processing sequence of allocation processing.

FIG. 16 shows a processing sequence of the allocation processing executed by the allocation unit 35 activated in step SP38 of the search processing (FIG. 11). After the activation processing, the allocation unit 35 executes this allocation processing, thereby allocating the resource configuration decided in step SP35 of the search processing to the user.

Specifically speaking, after starting this allocation processing, the allocation unit 35 first allocates the resource configuration decided in step SP35 of the search processing to the target user (SP70). The expression "allocate the resource configuration to the user" means that the relevant resource configuration enters the state of being in use. Incidentally, the interface unit 38 displays this result on the output devices 15.

Subsequently, the allocation unit 35 updates the request table 44 (FIG. 6) in response to the above-described allocation of the resource configuration to the target user (SP71). Specifically speaking, the allocation unit 35 adds the resource configuration identifier of the relevant resource configuration to the "resource configuration allocated to user" column 44G for the relevant entry in the request table 44 in order to add information indicating that the resource configuration has been allocated in response to the target resource request. Then, the allocation unit 35 terminates this allocation processing.

(1-3-7) Processing by Change Detection Unit

Figure 17:
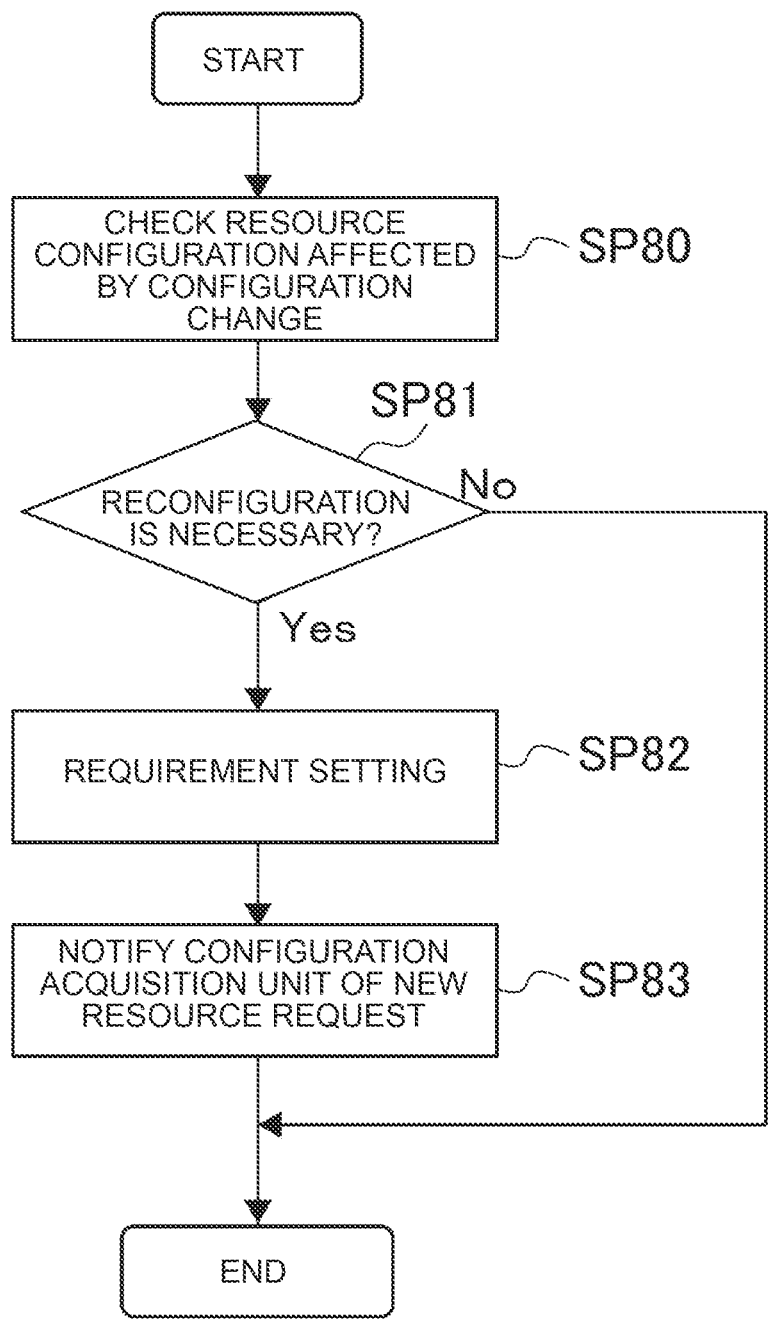
FIG. 17 is a flowchart illustrating a processing sequence of change detection processing.

FIG. 17 shows a processing sequence of the change detection processing executed by the change detection unit 36. The change detection unit 36 always monitors whether or not any configuration change has been made to each resource (server 6) belonging to the resource group 4. When the change detection unit 36 detects a change to any of the resource configurations, it reconstructs the relevant resource configuration by this change detection processing.

Specifically speaking, if the change detection unit 36 detects a change in the configuration of any of the resources constituting the resource group 4, it starts this change detection processing, first refers to the configuration table 43 (FIG. 5), and checks resource configurations that are affected by the configuration change of the resource then detected (SP80). Incidentally, the expression "configuration change" herein means, for example, a case where a failure has occurred in the resource or the resource is added or deleted. Also, the word "affected" herein means that the resource in which the configuration change has occurred is included in an existing resource configuration.

Next, the change detection unit 36 judges whether reconstruction is necessary or not (SP81). Specifically speaking, the change detection unit 36 judges, based on the check result of the check processing in step SP80, whether or not any resource configuration affected by the configuration change then detected exists and a user to whom that resource configuration is allocated exists. If step SP81 returns a negative judgment, the change detection unit 36 terminates this change processing.

On the other hand, if step SP81 returns an affirmative judgment, the change detection unit 36 releases the allocation of the resource configuration, which is affected by the configuration change as checked in step SP80, to the user, and then accordingly updates the request table 44. The change detection unit 36 then reads the resource request, which was made to allocate that resource configuration to the user, from the request table 44 and notifies the configuration acquisition unit 32 (FIG. 1) of this resource request as a new resource request (SP83). Incidentally, in this step SP83, the interface unit 38 may display the configuration change of the resource configuration and information about the resource request to change the allocation of the resource configuration affected by the configuration change on the output devices 15 and check with the resource administrator if the resource configuration should be reallocated or not.

Then, the change detection unit 36 terminates this change detection processing.

(1-3-8) Processing by Deletion Unit

Figure 18:
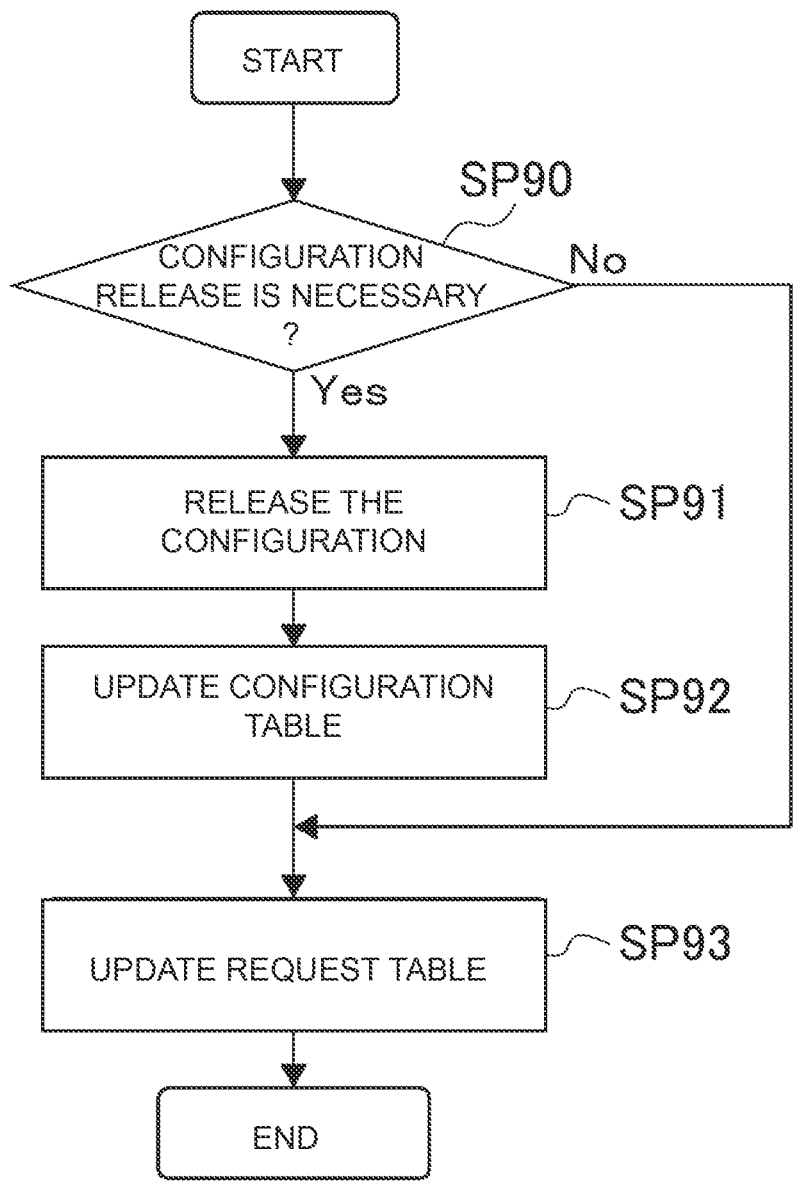
FIG. 18 is a flowchart illustrating a processing sequence of release processing.

FIG. 18 shows a processing sequence of the release processing executed by the release unit 37. If the resource request displayed by the interface unit 38 on the output devices 15 is designated on a resource request cancellation setting screen (not shown) for cancelling resource requests and an execution command to cancel the above-mentioned resource request is input, the release unit 37 cancels the designated resource request by executing the release processing.

Specifically speaking, after starting the release processing, the release unit 37 first judges whether it is necessary to release the resource configuration or not (SP90). If step SP90 returns a negative judgment, the release unit 37 proceeds to step SP93; and if step SP90 returns an affirmative judgment, the release unit 37 releases the resource configuration designated on the resource request cancellation setting screen (SP91). In order to perform release operation for this processing, it is possible to employ a method of using an API or a CLI provided by, for example, a management device for each resource belonging to the resource group 4, which is included in the resource configuration to be released, to release the configuration of the relevant function, or a method of showing the resources and functions of the resource configuration to be released to the resource administrator, thereby allowing, for example, the resource administrator to perform the release operation.

Next, the release unit 37 deletes the resource configuration released in step SP91 from the configuration table 43 (FIG. 5) (SP92) and also deletes the resource request to be cancelled from the request table 44 (FIG. 6) (SP93), and then terminates this release processing.

(1-4) Advantageous Effect of this Embodiment

Since the management server 3 searches the pool for the resource to be allocated to the target user based on both the performance and functions according to this embodiment as described above, the resource that satisfies the user's request in terms of both the performance and the functions can be allocated. As a result, a highly reliable computer system capable of allocating an optimum resource that satisfies the user's intended use can be realized.

(2) Second Embodiment

Figure 19:
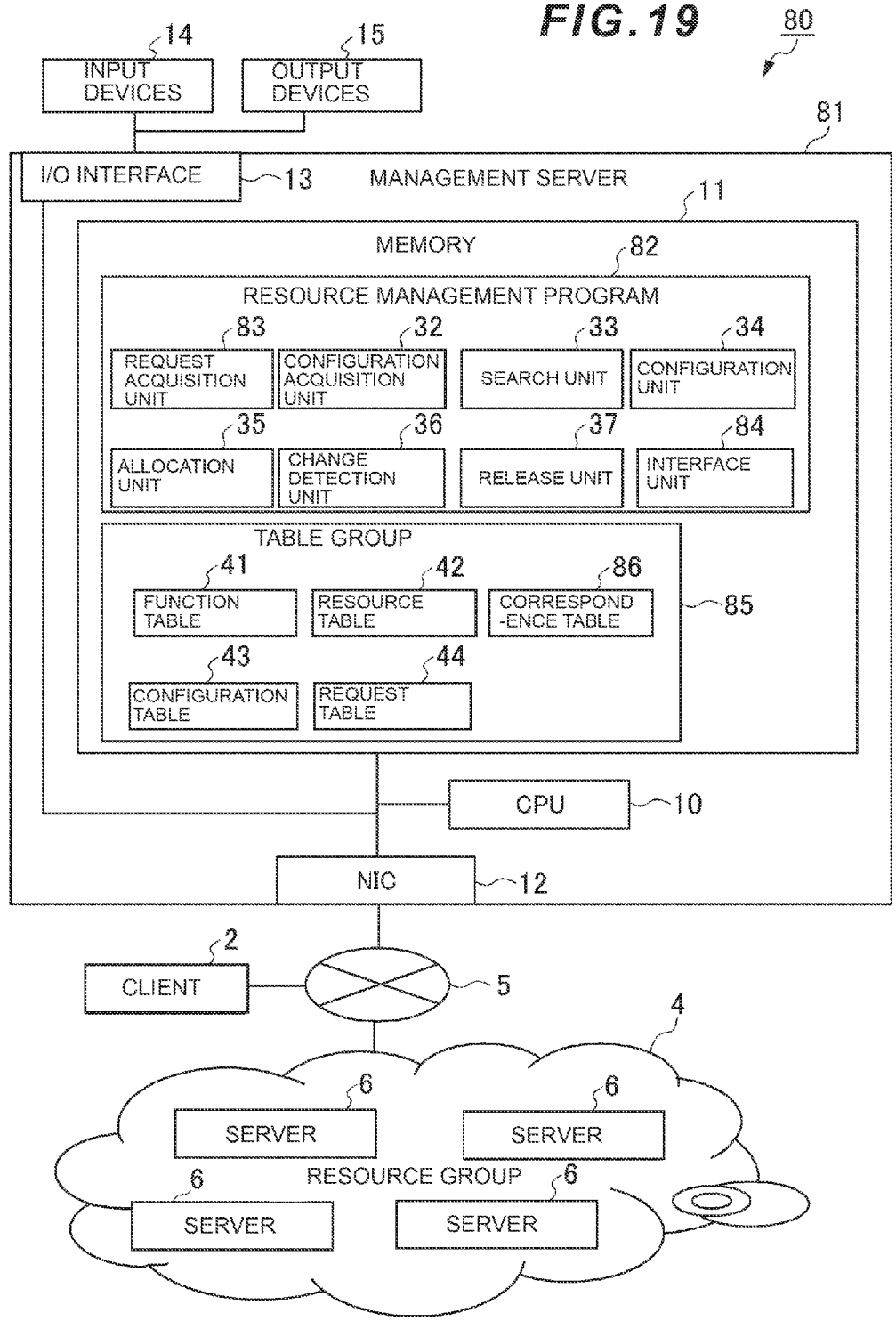
FIG. 19 is a block diagram showing the outline configuration of a computer system according to the second embodiment.

FIG. 19 in which the same reference numerals as used in FIG. 1 are given to parts corresponding to FIG. 1 shows a computer system 80 according to the second embodiment. The difference between the computer system 1 (FIG. 1) according to the first embodiment and this computer system 80 is that in the computer system 80, a correspondence table 86 in which function requirements relative to an importance level are stored in the memory 11 for a management server 81, so that the function requirements can be designated based on the correspondence table 86 without direct designation by the resource administrator.

FIG. 20 shows the configuration of the correspondence table 86. This correspondence table 86 is composed of an "importance level" column 86A, a "function requirement" column 86B, a "main resource sharing" column 86C, a "function configuration resource sharing" column 86D, and a "theoretical value" column 86E.

The "importance level" column 86A stores the importance level; and the "function requirement" column 86B stores function requirements that are set for the relevant importance level in advance. In this embodiment, this importance level is set in five levels from "1" to "5"; and the higher the numeric value becomes, the higher the importance level becomes.

The "main resource sharing" column 86C stores information about whether sharing the main resource with other users is permitted or not. The "function configuration resource sharing" column 86D stores information about whether sharing the resources necessary to configure the relevant function with other users is permitted or not.

The "theoretical value" column 86E stores a theoretical specification (catalogue specification) of the function as associated with the importance level stored in the "function requirement" column 86B. For example, in the case of the function relating to availability, the "theoretical value" column 86E stores information such as "availability: 99.99%."

As a means for creating and updating the correspondence table 86, it is possible to use, for example, a method of setting default values on a vendor's side in advance, a method of updating the theoretical values using an API or a CLI provided by, for example, a management device for the resource group 4, a method of having, for example, the resource administrator make settings using a UI displayed by the interface unit 38, or a method of having the resource management program 82 according to this embodiment obtain information from files.

Figure 21:
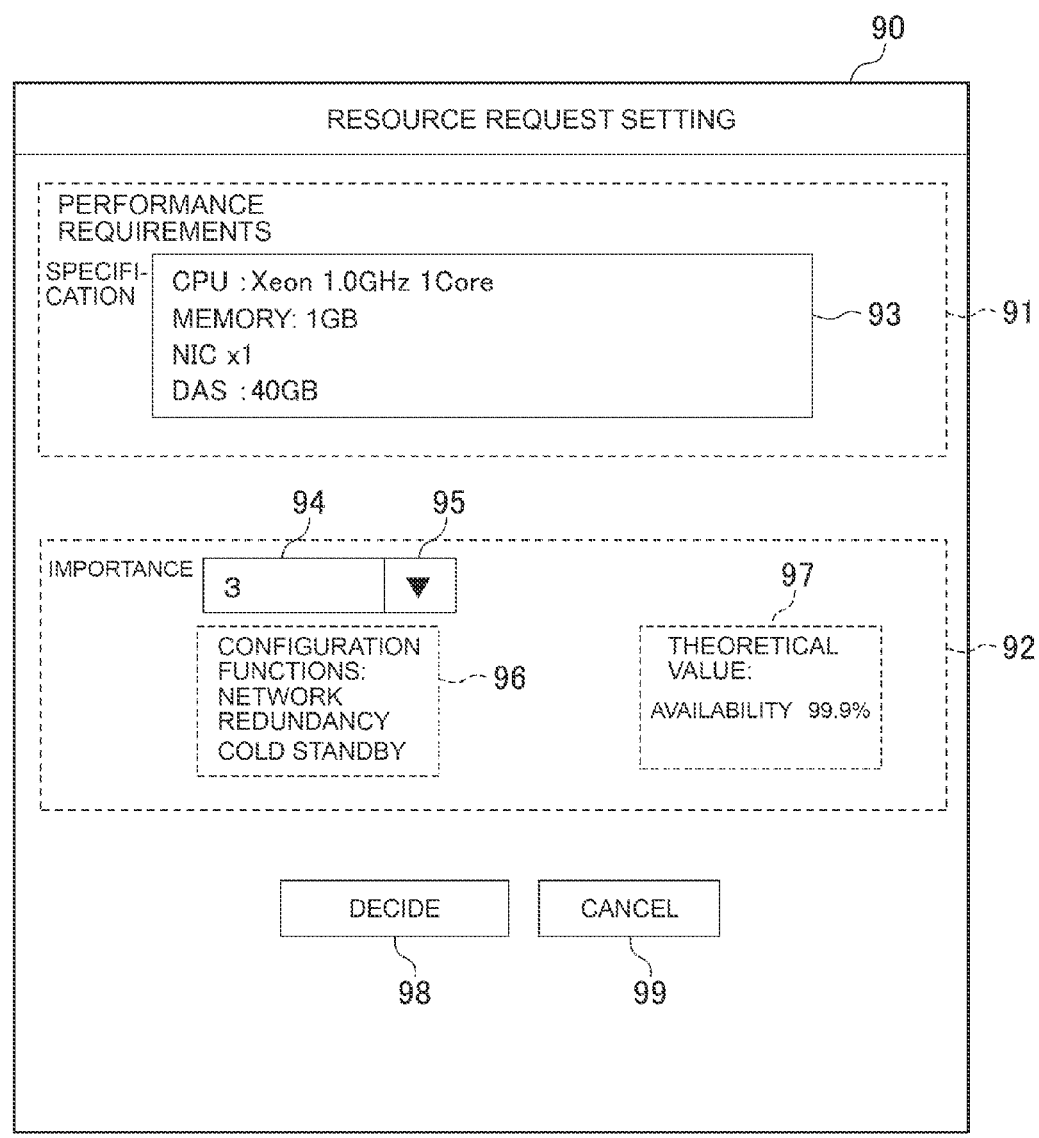
FIG. 21 is a schematic diagram showing the outline configuration of a resource request setting screen according to the second embodiment.

FIG. 21 shows an example of the configuration of a resource allocation setting screen 90 according to the second embodiment to be displayed by the interface unit 84 (FIG. 19) on the output devices 15 when a command to display the resource allocation setting screen is input. This resource allocation setting screen 90 is displayed on, for example, the output devices 15 for the management server 81 or output devices for other terminals connected via a network to the management server 81, using a browser or a dedicated program provided in the terminals.

The resource allocation setting screen 90 includes a performance requirement designation area 91 and an importance level designation area 92. The performance requirement designation area 91 has the configuration and function similar to those of the performance requirement designation area 51 in the resource allocation setting screen 50 according to the first embodiment as described earlier with reference to FIG. 8.

The importance level designation area 92 is provided with a selected importance level display part 94; and a pull-down button 95 is provided on the right side of this selected importance level display part 94. In the importance level designation area 92, a pull-down menu (not shown) with numeric values from "1" to "5" representing the importance levels is displayed by clicking the pull-down button 95; and a desired numeric value (importance level) is then selected from the pull-down menu, so that the selected numeric value can be displayed in the selected importance level display part 94. The numeric value then displayed in the selected importance level display part 94 becomes the importance level designated by the resource administrator at that time.

If the importance level is designated as described above, the content of configuration functions associated with the designated importance level is displayed in a configuration function display area 96, and availability expected by the configuration functions is displayed in a theoretical value display area 97.

The performance requirements and the importance level can be set in the resource allocation setting screen 90 by inputting the performance requirements of the resource, which is intended to be allocated to the target user, in the performance request input part 93 of the performance requirement designation area 91, having a desired importance level displayed in the selected importance level display part 94 of the importance level designation area 92, and then clicking a decision button 98. Then, the performance requirements and the importance level as well as information such as a user name of the target user are given as a resource request to the request acquisition unit 83 (FIG. 19). Also, it is possible to cancel all the operations then performed on the resource allocation setting screen 90 by clicking a cancellation button 99 on the resource allocation setting screen 90.

After receiving the resource request from the interface unit 84, the request acquisition unit 83 refers to the correspondence table 86 and obtains the function requirements corresponding to the importance level included in the resource request. The request acquisition unit 83 also executes the same processing as that executed in step SP11 and subsequent steps of the request acquisition processing according to the first embodiment as described earlier with reference to FIG. 9.

Incidentally, since all of the configuration acquisition processing executed by the configuration acquisition unit 32 other than the request acquisition unit 83, the search processing executed by the search unit 33, the configuration processing executed by the configuration unit 34, the allocation processing executed by the allocation unit 35, the change detection processing executed by the change detection unit 36, and the release processing executed by the release unit 37 are the same as those according to the first embodiment, an explanation about the above-listed processing has been herein omitted.

Since the computer system 80 according to this embodiment can designate the function requirements based on the correspondence table 86 as described above without having the resource administrator directly designate the function requirements, it is possible to reduce the load on the resource administrator.

(3) Third Embodiment

Figure 22:
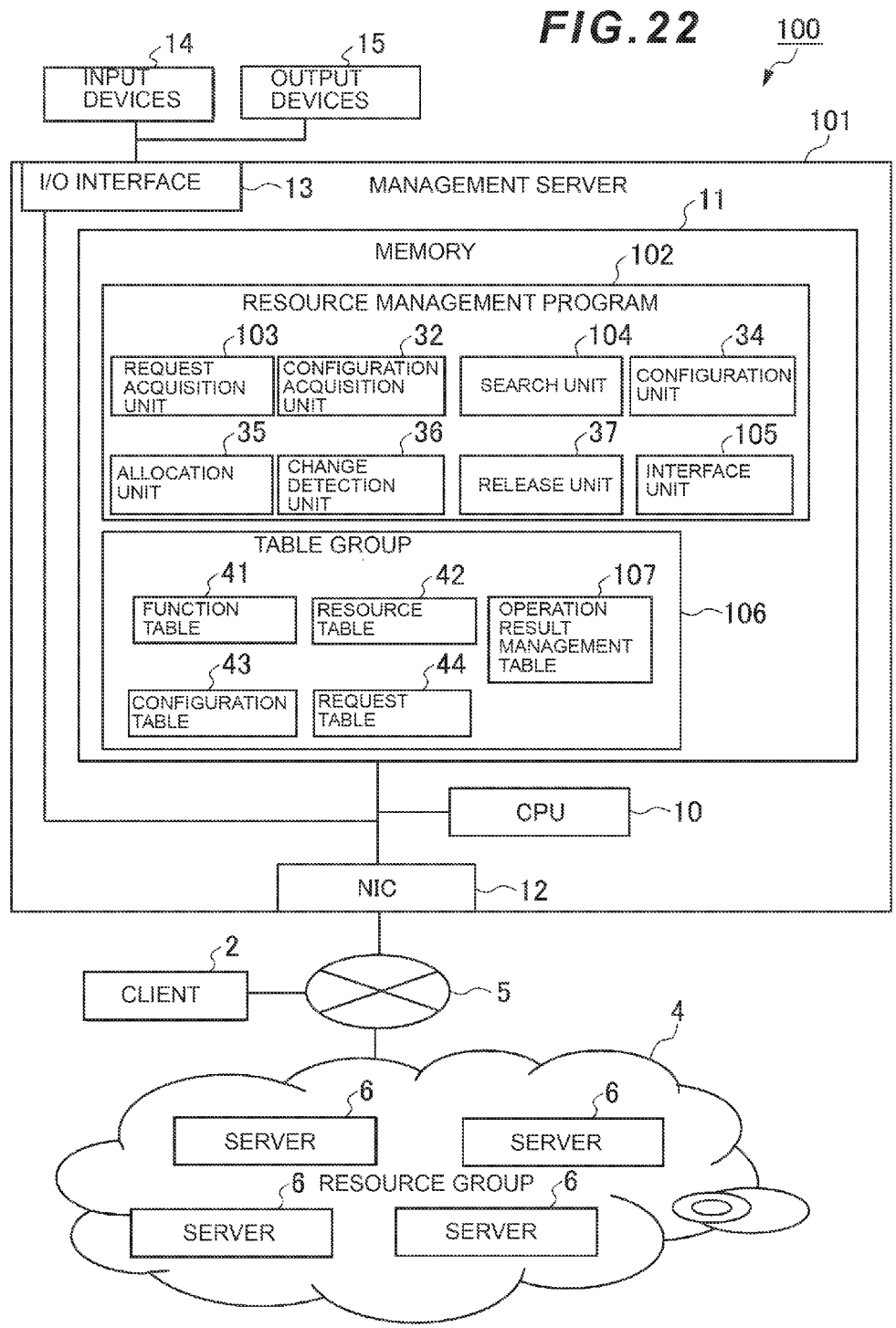
FIG. 22 is a block diagram showing the outline configuration of a computer system according to the third embodiment.

FIG. 22 in which the same reference numerals as used in FIG. 1 are given to parts corresponding to FIG. 1 shows a computer system 100 according to the third embodiment. This computer system 100 is characterized in that the function requirements can be selected based on the past operation results of each function.

As a means for selecting the function requirements as described above, an operation result management table 107 is stored as a component of a table group 106 in the memory 11 for a management server 101. This operation result management table 107 is a table used to manage the operation results for each function and is composed of a "number" column 107A, a "configuration function" column 107B, an "operation results" column 107C, and a "configuration identifier" column 107D as shown in FIG. 23.

The "number" column 107A stores an entry number of the relevant entry. The "configuration function" column 107B stores a function name (such as "cold standby" and "virtual server") for the relevant function. The "operation results" column 107C stores the past operation results of the relevant function. For example, if availability is an index of the operation results, the "operation results" column 107C stores a specific numeric value such as "availability: 99.9%." Furthermore, the "configuration identifier" column 107D stores an identifier of the resource configuration constituting the relevant function (resource configuration identifier).

Figure 24:
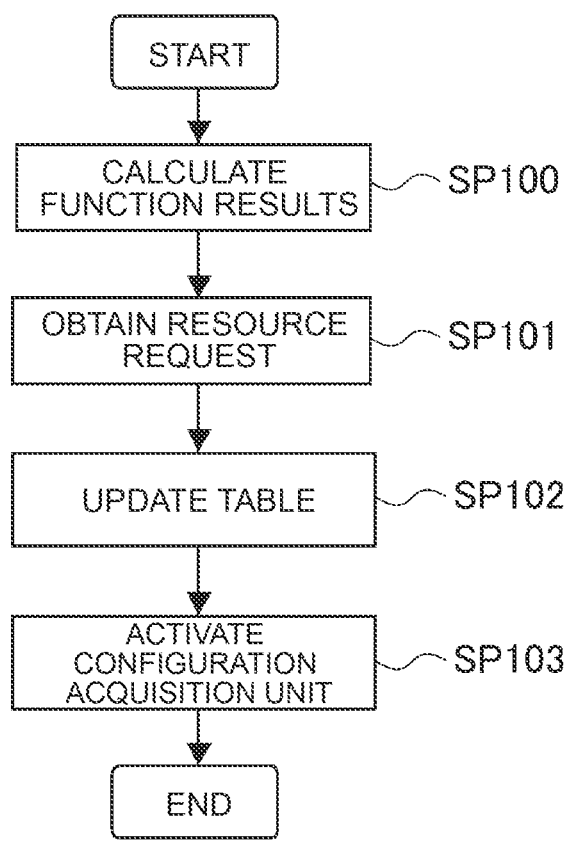
FIG. 24 is a flowchart illustrating a processing sequence of request acquisition processing according to the third embodiment.

FIG. 24 shows a processing sequence of request acquisition processing executed by a request acquisition unit 103 for a resource management program 102 according to this embodiment. The difference between this processing sequence of the request acquisition processing and the request acquisition processing according to the first embodiment (FIG. 9) is that processing in step SP100 is added.

In this step SP100, the request acquisition unit 103 refers to the operation result table 107 and calculates the operation result value for each function. For example, the request acquisition unit 103 calculates an average value of the operation results for each function and sets the average value as the result value for the relevant function. Then, the request acquisition unit 103 executes processing from step SP101 to step SP103 in the same manner as the processing from step SP10 to step SP12 shown in FIG. 9.

Figure 25:
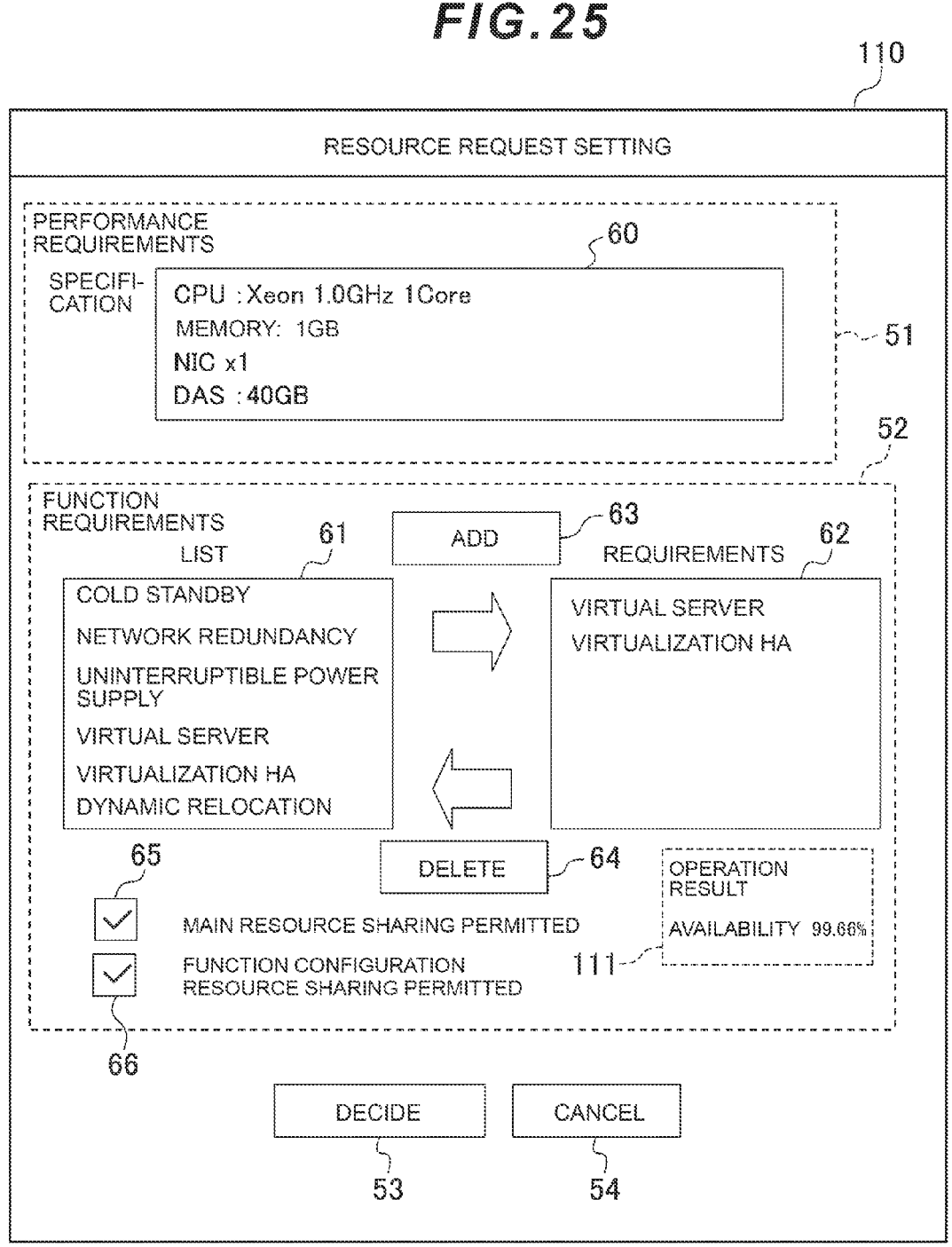
FIG. 25 is a schematic diagram showing the outline configuration of a resource request setting screen according to the third embodiment.

Meanwhile, FIG. 25 in which the same reference numerals as used in FIG. 8 are given to parts corresponding to FIG. 8 shows an example of the configuration of a resource allocation setting screen 110 provided by an interface unit 105 (FIG. 22) according to this embodiment. The difference between the resource allocation setting screen 50 (FIG. 8) according to the first embodiment and the resource allocation setting screen 110 is that an operation result display area 111 is provided below the selected function display part 62 in the function requirement designation area 52 on the resource allocation setting screen 110. In this embodiment, the operation result display area 111 displays the operation result value calculated with regard to the function requirements then displayed in the selected function display part 62. Incidentally, if a plurality of function requirements are displayed in the selected function display part 62 as shown in FIG. 25, the operation result value displayed in the operation result display area 111 is an average value of the operation result values for these function requirements.

Figure 26:
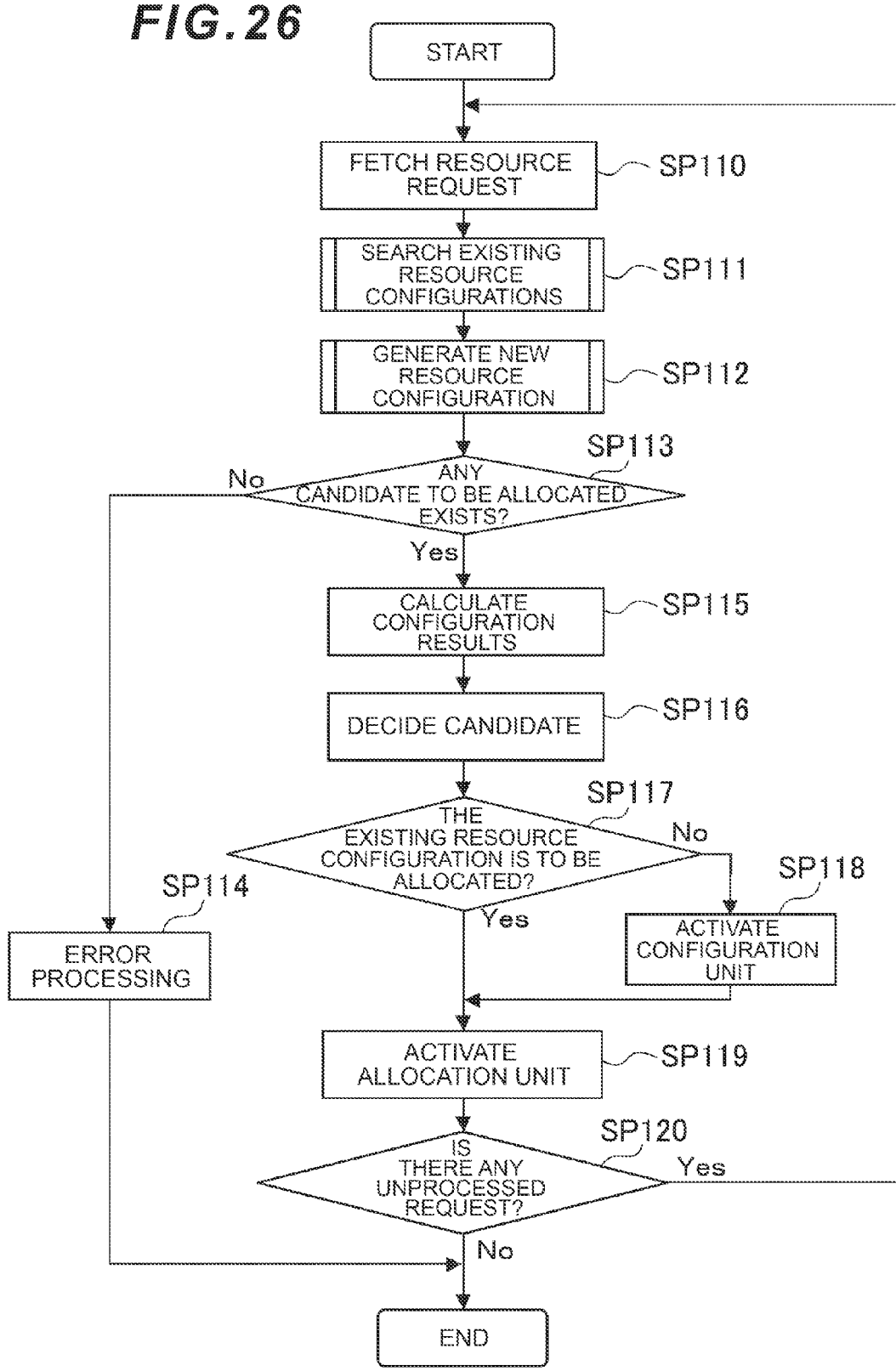
FIG. 26 is a flowchart illustrating a processing sequence of search processing according to the third embodiment.

FIG. 26 shows a processing sequence of search processing executed by the search unit 104 (FIG. 22) according to this embodiment. The difference between this processing sequence of the search processing and the search processing according to the first embodiment (FIG. 11) is that processing in step SP115 is added.

In this step SP115, the search unit 104 refers to the operation result table 107 and calculates an operation result value of each resource configuration candidate with an existing resource configuration. For example, the search unit 104 calculates an average value of the results for each function and sets the average value as a result value for the relevant function. The processing steps other than SP115, that is, step SP110 to step SP114 and step SP116 to step SP120, are the same as the processing steps SP30 to SP34 and SP35 to SP39 in the search processing according to the first embodiment.

Figure 27:
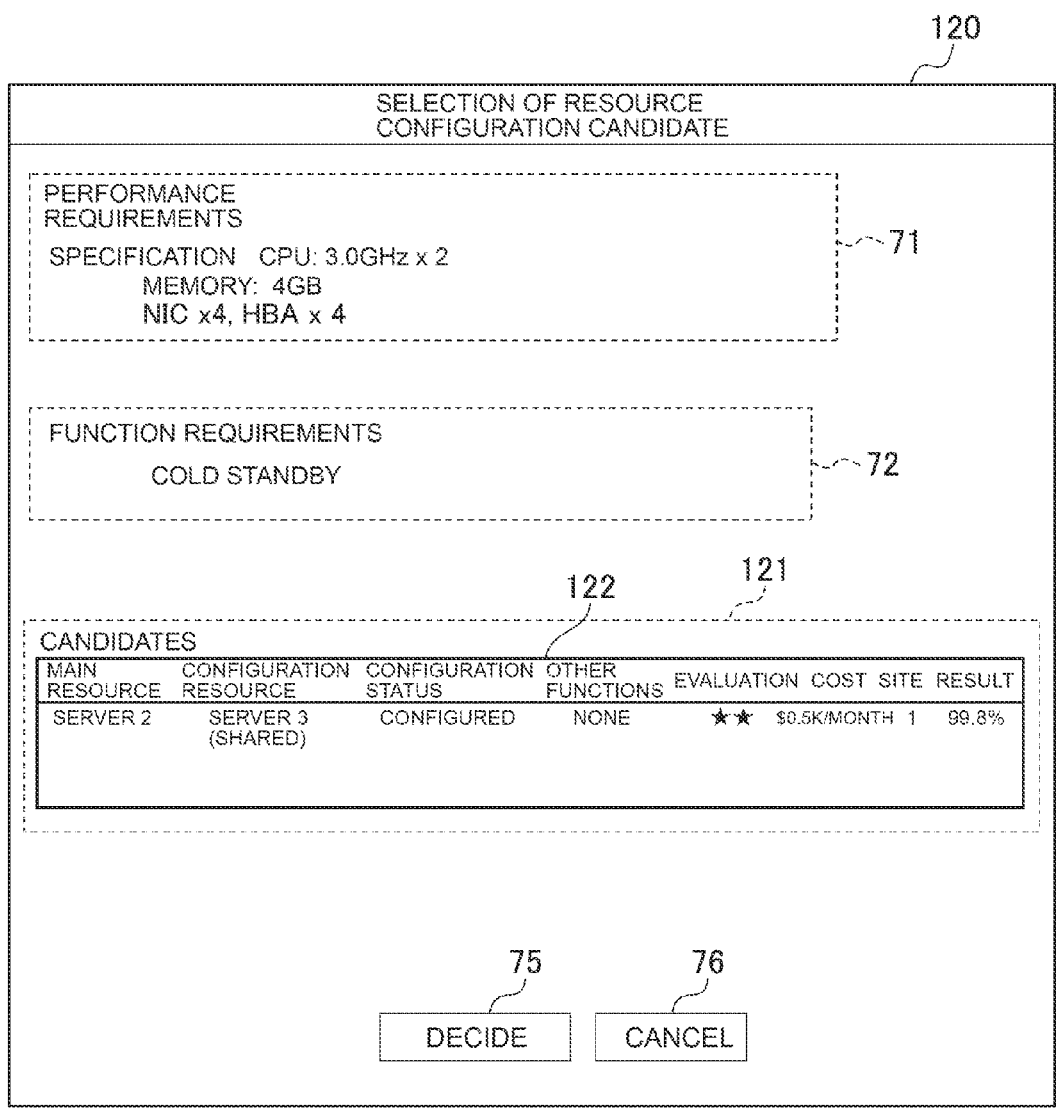
FIG. 27 is a schematic diagram showing the outline configuration of a resource configuration candidate selection screen according to the third embodiment.

FIG. 27 in which the same reference numerals as used in FIG. 14 are given to parts corresponding to FIG. 14 shows a resource configuration candidate selection screen 120 according to this embodiment. The difference between this resource configuration candidate selection screen 120 and the resource configuration candidate selection screen 70 according to the first embodiment (FIG. 14) is that in the case of the resource configuration candidate selection screen 120 according to this embodiment, the operation result ("result" in FIG. 27) of a function requirement provided in the relevant resource configuration candidate displayed in a resource configuration candidate display part 122 of a candidate display area 121 is displayed in the resource configuration candidate display part 122 as information relating to that resource configuration candidate displayed in the resource configuration candidate display part 122. As a result, when the resource administrator selects the resource configuration candidate, it is easier for him/her to select the resource configuration that satisfies the user's need by referring to this operation result.

Since the computer system 100 according to this embodiment can select the function requirement based on the past operation result of each function, it is possible to reduce the load on the resource administrator in the same manner as the computer system 80 according to the second embodiment.

(4) Other Embodiments

The first to third embodiments have described the case where the present invention is used in the computer system 1, 80, 100 configured as shown in FIG. 1, FIG. 19, or FIG. 22; however, the invention is not limited to those examples and can be widely used in computer systems with various other configurations.

The first to third embodiments have also described the case where the processing of, for example, the request acquisition unit 31, 103 and the configuration acquisition unit 32 for the resource management program 30, 82, 102 is configured as a program; however, the invention is not limited to those examples, and part or whole of the processing may be configured as processing to be executed by hardware.

Furthermore, the first to third embodiments have described the case where the resource request setting screen 50, 90, 110 is configured as shown in FIG. 8, FIG. 21, or FIG. 25; however, the invention is not limited to those examples, and various other configurations can be used as the configuration of the resource request setting screen.

Similarly, the first to third embodiment have described the case where the resource configuration candidate selection screen 70, 120 is configured as shown in FIG. 14 or FIG. 27; however, the invention is not limited to those examples, and various other configurations can be used as the configuration of the resource configuration candidate selection screen.

What is claimed is:
1. A management apparatus for allocating a plurality of computer resources to a user in response to a resource request, the management apparatus comprising:

a resource table configured to maintain resource information including resource capacity of each of a plurality of computer resources and a function of the plurality of computer resources;

a function table configured to maintain function information including a resource type and a configuration condition specifying a configuration condition resource capacity and a configuration condition sharing status required to configure each function;

a request table configured to maintain the resource request, wherein the request table includes a performance requirement and a function requirement for the user resource request;

a search unit configured to search the resource table and the function table for one or more candidate computer resources that satisfies the requirements of the resource request and the configuration condition resource capacity and the configuration condition sharing status required to configure each function of the user resource request, wherein the search unit compares performance of each the one or more candidate computer resources from the performance table with the performance requirement from the user resource request and selects the one or more candidate resource that has a performance which is equal to or higher than the performance requirement from the user request, and wherein the search unit compares function of the selected the one or more candidate computer resources from the function table with the function requirement from the user request and designates as a main resource one of the selected one or more candidate computer resources which is equipped with all functions in the function requirement; and an allocation unit allocates the main computer resource to the user.

2. The management apparatus according to claim 1,
wherein the resource table includes the cost of usage for each computer resource, and
wherein the search unit is further configured to select a computer resources based on the cost of usage for each computer resource.

3. The management apparatus according to claim 1, further comprising an interface unit;
the interface unit configured to display to the user an interface for setting the performance and function requirements for the computer resource in the resource request.

4. The management apparatus according to claim 1, further comprising:
a configuration unit for configuring the function of the user request in accordance with the function requirement designated in the resource request; and
a release unit for releasing, from the user, resources allocated for the configuration condition resource capacity and the configuration condition sharing status used to configure each function once the function has been configured.

5. A method for managing and allocating a plurality of computer resources to a user in response to a resource request, the method comprising:
accessing resource information from a resource table, the resource information includes resource capacity of each of a plurality of computer resources and a function of the plurality of computer resources;
accessing function information from a function table, the function information includes a resource type and a configuration condition specifying a configuration condition resource capacity and a configuration condition sharing status required to configure each function;

receiving a resource request from the user, the resource request includes a performance requirement and function requirement;

searching the resource information and the function information for one or more candidate computer resources that satisfies the requirements of the resource request and the configuration condition resource capacity and the configuration condition sharing status required to configure each function of the user resource request, wherein the searching includes comparing performance of each the one or more candidate computer resources from the performance table with the performance requirement from the user resource request and selects the one or more candidate resource that has a performance which is equal to or higher than the performance requirement from the user request, and wherein the searching further includes compares function of the selected the one or more candidate computer resources from the function table with the function requirement from the user request and designates as a main resource one of the selected one or more candidate computer resources which is equipped with all functions in the function requirement; and allocating the main candidate computer resources to the user.

6. The method according to claim 5, further comprising the steps of:
configuring the function of the resource request in accordance with the function requirement designated in the resource request; and
releasing, from the user, resources allocated for the configuration condition resource capacity and the configuration condition sharing status used to configure each function once the function has been configured.

7. The method according to claim 5, wherein:
the resource information further includes the cost of usage for each computer resource, and a computer resource is allocated to the user based on at least in part based on the cost of usage for each computer resource.

8. The method according to claim 5, further comprising the step of:
displaying an interface to the user, the interface configured for setting the performance and function requirements for the computer resource in the resource request.

9. A computer program product residing on a non-transitory processor-readable medium and comprising processor readable instructions configured to cause one or more processors to:
access resource information from a resource table, the resource information includes resource capacity of each of a plurality of computer resources and a function of the plurality of computer resources;
access function information from a function table, the function information includes a resource type and a configuration condition specifying a configuration condition resource capacity required to configure each function;
receive a resource request from the user, the resource request includes a performance requirement and function requirement;
search the resource information and the function information for one or more candidate computer resources that satisfies the requirements of the resource request and the configuration condition resource capacity and the configuration condition sharing status required to configure each function of the user resource request, wherein the searching includes comparing performance of each the one or more candidate computer resources from the performance table with the performance requirement from the user resource request and selects the one or more candidate resource that has a performance which is equal to or higher than the performance requirement from the user request, and wherein the searching further includes compares function of the selected the one or more candidate computer resources from the function table with the function requirement from the user request and designates as a main resource one of the selected one or more candidate computer resources which is equipped with all functions in the function requirement; and allocate the main computer resources to the user.

10. The computer program of according to claim 9, further comprising processor readable instructions configured to cause one or more processors to:

configure the function of the resource request in accordance with the function requirement designated in the resource request; and release, from the user, resources allocated for the configuration condition resource capacity and the configuration condition sharing status used to configure each function once the function has been configured.

11. The computer program of according to claim 9, wherein:

the resource information further includes the cost of usage for each computer resource, and a computer resource is allocated to the user based on at least in part based on the cost of usage for each computer resource.

12. The computer program of according to claim 9, further comprising processor readable instructions configured to cause one or more processors to:

display an interface to the user, the interface configured for setting the performance and function requirements for the computer resource in the resource request.

* * * * *